US012530652B2

(12) United States Patent
Adbesh et al.

(10) Patent No.: US 12,530,652 B2
(45) Date of Patent: Jan. 20, 2026

(54) HOURS OF SERVICE ENGINE FOR OFFSHORE ROUTING AND DAY CAB TRACTORS

(71) Applicant: Walmart Apollo, LLC, Bentonville, AR (US)

(72) Inventors: Fereydoun Adbesh, Rogers, AR (US); Tiantian Nie, Fremont, CA (US); Ti Zhang, Rocklin, CA (US); Jing Huang, San Jose, CA (US); Mingang Fu, Palo Alto, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 159 days.

(21) Appl. No.: 18/103,266

(22) Filed: Jan. 30, 2023

(65) Prior Publication Data

US 2024/0281752 A1  Aug. 22, 2024

(51) Int. Cl.
  *G06Q 10/083* (2024.01)
  *G06Q 10/0831* (2023.01)
  *G06Q 10/0835* (2023.01)

(52) U.S. Cl.
  CPC ............ *G06Q 10/08355* (2013.01); *G06Q 10/0831* (2013.01)

(58) Field of Classification Search
  CPC ......... G06Q 10/08355; G06Q 10/0831; G06Q 50/40

(Continued)

(56) References Cited

U.S. PATENT DOCUMENTS

| 2006/0200008 A1* | 9/2006 | Moore-Ede | B60K 28/06 128/920 |
| 2016/0011001 A1* | 1/2016 | Emory | G01C 21/3407 701/465 |

(Continued)

FOREIGN PATENT DOCUMENTS

JP  2014126911 A  *  7/2014

OTHER PUBLICATIONS

A. Goel and V. Gruhn, "Drivers' working hours in vehicle routing and scheduling," 2006 IEEE Intelligent Transportation Systems Conference, Toronto, ON, Canada, 2006, pp. 1280-1285. (Year: 2006).*

(Continued)

*Primary Examiner* — Jeff Zimmerman
*Assistant Examiner* — Hunter Molnar
(74) *Attorney, Agent, or Firm* — FOLEY & LARDNER LLP

(57) ABSTRACT

A system including one or more processors and one or more non-transitory computer-readable media storing computing instructions that, when executed on the one or more processors perform certain functions: obtaining an input comprising a sequence of service locations; iterating through pairs of consecutive service locations of the service locations to determine when a port for the first service location is different from the port for the second service location; adding the port for the first service location and the port for the second service location; and iterating through hours of service (HOS) states of the offshore route; determining whether to add one or more additional HOS states in the offshore route; and resetting a cumulative drive time to zero for each offshore port-to-port service. Other embodiments are disclosed.

20 Claims, 11 Drawing Sheets

(58) Field of Classification Search
USPC .......................................................... 705/331
See application file for complete search history.

(56) References Cited

U.S. PATENT DOCUMENTS

2017/0154394 A1*  6/2017  Kan .................... G06Q 10/1097
2020/0134551 A1*  4/2020  Singh ..................... G06Q 20/10
2020/0242554 A1*  7/2020  Huang ............. G06Q 10/08355
2022/0129844 A1   4/2022  Choudhury et al.
2023/0342875 A1* 10/2023  Ranjan ................... G06Q 10/02

OTHER PUBLICATIONS

Interstate Truck Driver's Guide to Hours of Service. U.S. Department of Transportation, Federal Motor Carrier Safety Administration. Apr. 2022. pp. 3-20. (Year: 2022).*
What is Same-Day Optimization and How Will It Benefit Me?, The Descartes Systems Group Inc. 2022.

* cited by examiner

1010

| 1105 – Checking whether one or more stores have day cab tractor limits |

| 1110 – Running a second feasibility check |

| 1115 – Outputting the HOS states for the offshore route |

HOURS OF SERVICE ENGINE FOR OFFSHORE ROUTING AND DAY CAB TRACTORS

TECHNICAL FIELD

This disclosure relates generally to an hours of service engine for offshore routing and day cab tractors.

BACKGROUND

When an outbound route plan includes an overseas destination, a stop along the route can include transporting the trailers to a ship and/or an airplane in between stop sequences in the outbound route plan. In such scenarios, a route plan can become complex and problematic for drivers to track driver states for offshore routes.

BRIEF DESCRIPTION OF THE DRAWINGS

To facilitate further description of the embodiments, the following drawings are provided in which.

Figure 1:
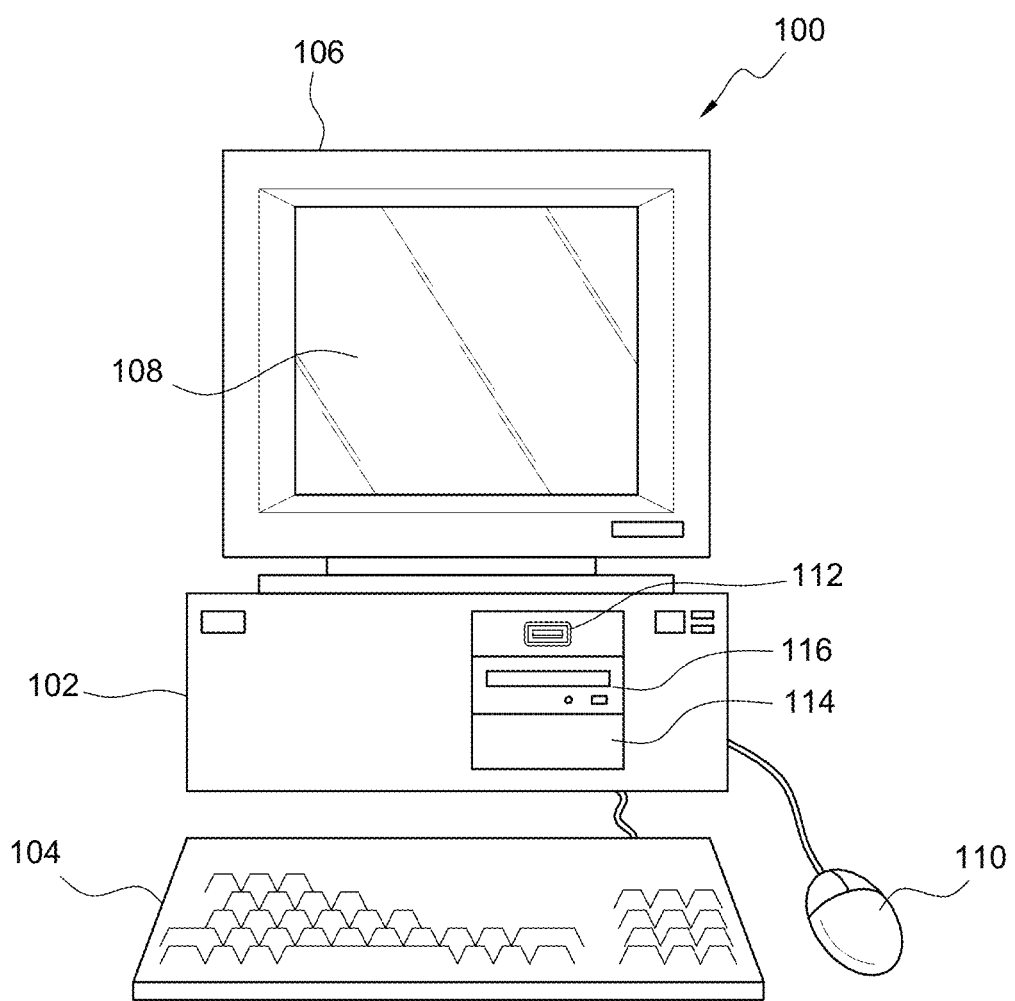
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
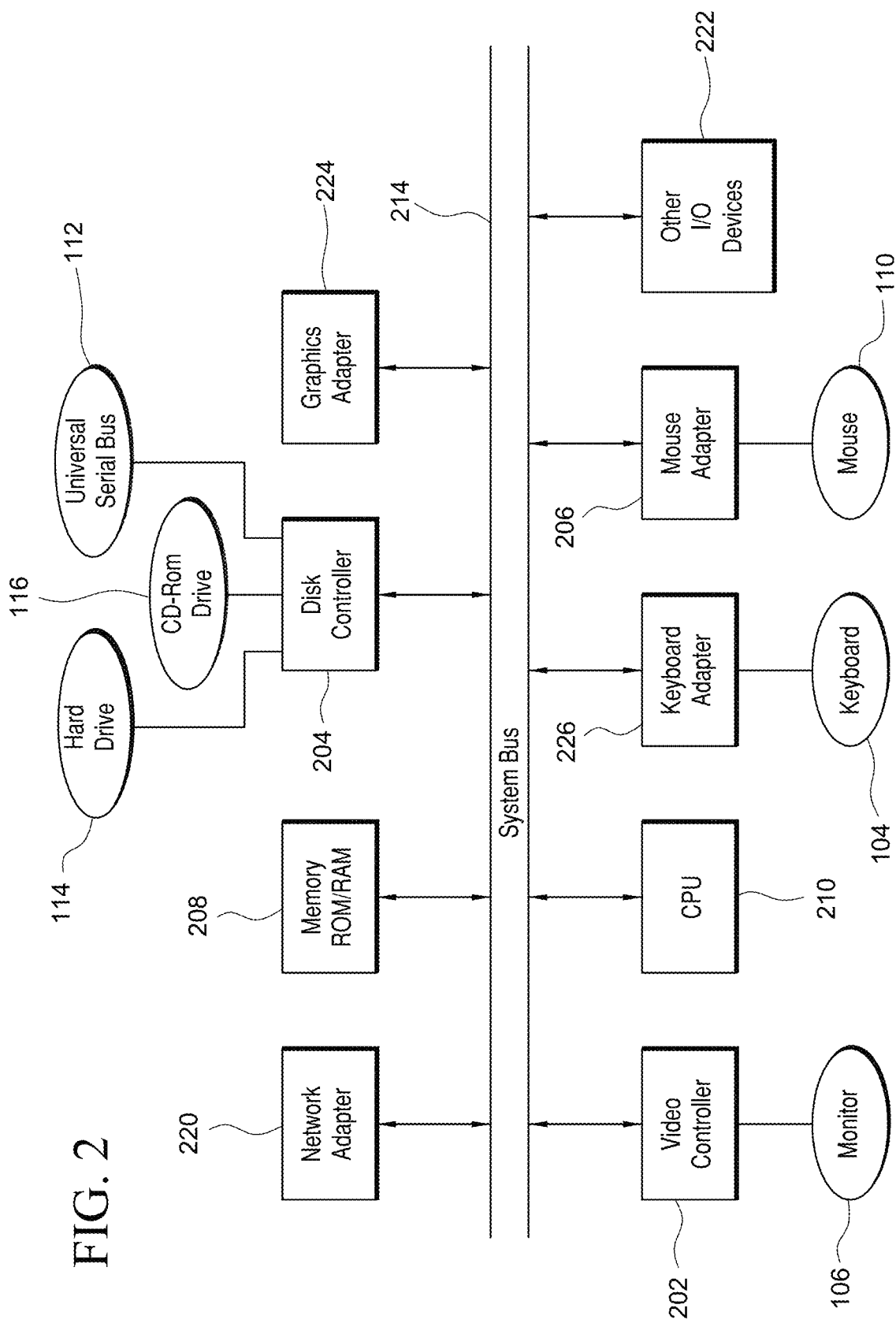
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
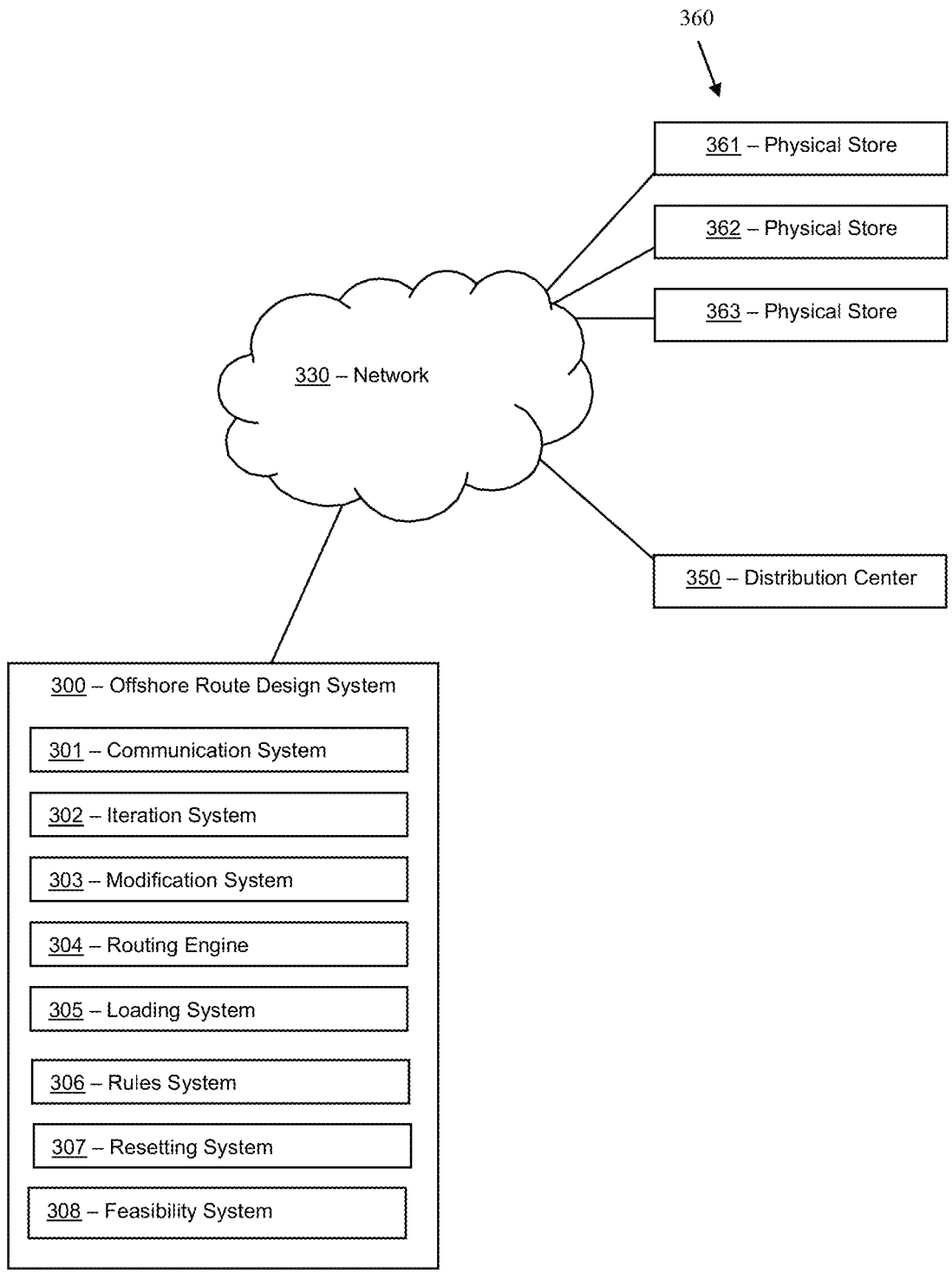
FIG. 3 illustrates a block diagram of a system for an offshore routing system, according to an embodiment.

Turning ahead in the drawings, FIG. 3 illustrates a block diagram of an offshore route design system 300 that can be employed for automatic generation of an offshore route design, according to an embodiment. Offshore route design system 300 is merely exemplary and embodiments of the system are not limited to the embodiments presented herein. The offshore route design system can be employed in many different embodiments or examples not specifically depicted or described herein. In some embodiments, certain elements, modules, or systems of offshore route design system 300 can perform various procedures, processes, and/or activities. In other embodiments, the procedures, processes, and/or activities can be performed by other suitable elements, modules, engines, or systems of offshore route design system 300. Offshore route design system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of offshore route design system 300 described herein.

In many embodiments, offshore route design system 300 can be a computer system, such as computer system 100 (FIG. 1), as described above, and can each be a single computer, a single server, or a cluster or collection of computers or servers, or a cloud of computers or servers. In another embodiment, a single computer system can host offshore route design system 300. Additional details regarding offshore route design system 300 are described herein.

In some embodiments, offshore route design system 300 can be in data communication through a network 330 with physical stores 360, which can include physical stores 361-363, for example, and distribution centers, such as distribution center 350. In several embodiments, each of the physical stores (e.g., 360) and each of the distribution centers (e.g., 350) can be a physical, brick-and-mortar location that are associated (e.g., operated by a common business entity or entities under common control) with offshore route design system 300. In many embodiments, the physical stores (e.g., 360) and the distribution centers (e.g., 350) each can include one or more computer systems.

In a number of embodiments, each of physical stores 360 can be a retail store, such as a department store, a grocery store, or a super store (e.g., both a grocery store and a department store). In many embodiments, the distribution centers (e.g., 350) can provide the items sold at the physical stores (e.g., 360). For example, a distribution center (e.g., 350) can supply and/or replenish stock at the physical stores (e.g., 360) that are in a region of the distribution center. In many embodiments, a physical store (e.g., 361-363) can submit an order to a distribution center (e.g., 350) to supply and/or replenish stock at the physical store (e.g., 361-363). In many embodiments, distribution center 350 can be referred to as a warehouse or other facility that does not sell products directly to a customer.

In some embodiments, offshore route design system 300 can be a distributed system that includes one or more systems in each of the distribution centers (e.g., 350). In other embodiments, offshore route design system 300 can be a centralized system that communicates with computer systems in the physical stores (e.g., 360) and distribution centers (e.g., 350). In some embodiments, network 330 can be an internal network that is not open to the public, which can be used for communications between offshore route design system 300, physical stores (e.g., 360), and distribution centers (e.g., 350). In other embodiments, network 330 can be a public network, such as the Internet. In several embodiments, operators and/or administrators of offshore route design system 300 can manage offshore route design system 300, the processor(s) of offshore route design system 300, and/or the memory storage unit(s) of offshore route design system 300 using the input device(s) and/or display device(s) of offshore route design system 300, or portions thereof in each case.

In several embodiments, offshore route design system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to offshore route design system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of offshore route design system 300. In a similar manner, the processors and/or the non-transitory computer-readable media can be local and/or remote to each other.

Meanwhile, in many embodiments, offshore route design system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between offshore route design system 300, physical stores 360, distribution center 350, and/or the one or more databases can be implemented using any suitable manner of wired and/or wireless communication. Accordingly, offshore route design system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In several embodiments, offshore route design system 300 can be employed to receive a sequence of service locations (e.g., stores) as part of an offshore route plan (e.g., offshore routes) to fulfill orders for a physical store (e.g., 361-363). In various embodiments, offshore route design system 300 also can automatically design how an order will be delivered to stores located at one or more ports and/or located between ports and/or other locations. In several embodiments, offshore route design system 300 can generate one or more improved or modified offshore route plans that are feasible. In various embodiments, an offshore route plan can be improved or modified by adding driver states or time window constraints while maintaining compliance with route constraints, such as hours of service (HOS) rules, store rules, loading rules, and/or another suitable constraint applicable for offshore route plans. In various embodiments, adding driver states to an initial offshore route plan can convert a previously feasible offshore route plan into an infeasible offshore route plan. A feasible offshore route plan is one that satisfies the Department of Transportation hours of service rules for drivers and store rules and/or constraints for tractor types and delivery time windows.

In many embodiments, offshore route design system 300 can include a communication system 301, an iteration system 302, a modification system 303, a routing engine 304, a loading system 305, a rules system 306, a resetting system 307, and/or a feasibility system 308. Offshore route design system 300 also can include using an HOS engine (not shown) to conduct HOS feasibility checks for each service segment along the offshore route plan. In number of embodiments, a service segment can involve one or more cumulative distances travelled on the offshore route. In many embodiments, the systems of offshore route design system 300 can be modules of computing instructions (e.g., software modules) stored at non-transitory computer readable media that operate on one or more processors. In other embodiments, the systems of offshore route design system 300 can be implemented in hardware. Offshore route design system 300 can be a computer system, such as computer system 100 (FIG. 1), as described above, and can be a single computer, a single server, or a cluster or collection of computers or servers, or a cloud of computers or servers. In another embodiment, a single computer system can host offshore route design system 300. Additional details regarding offshore route design system 300 and the components thereof are described herein.

Figure 4:
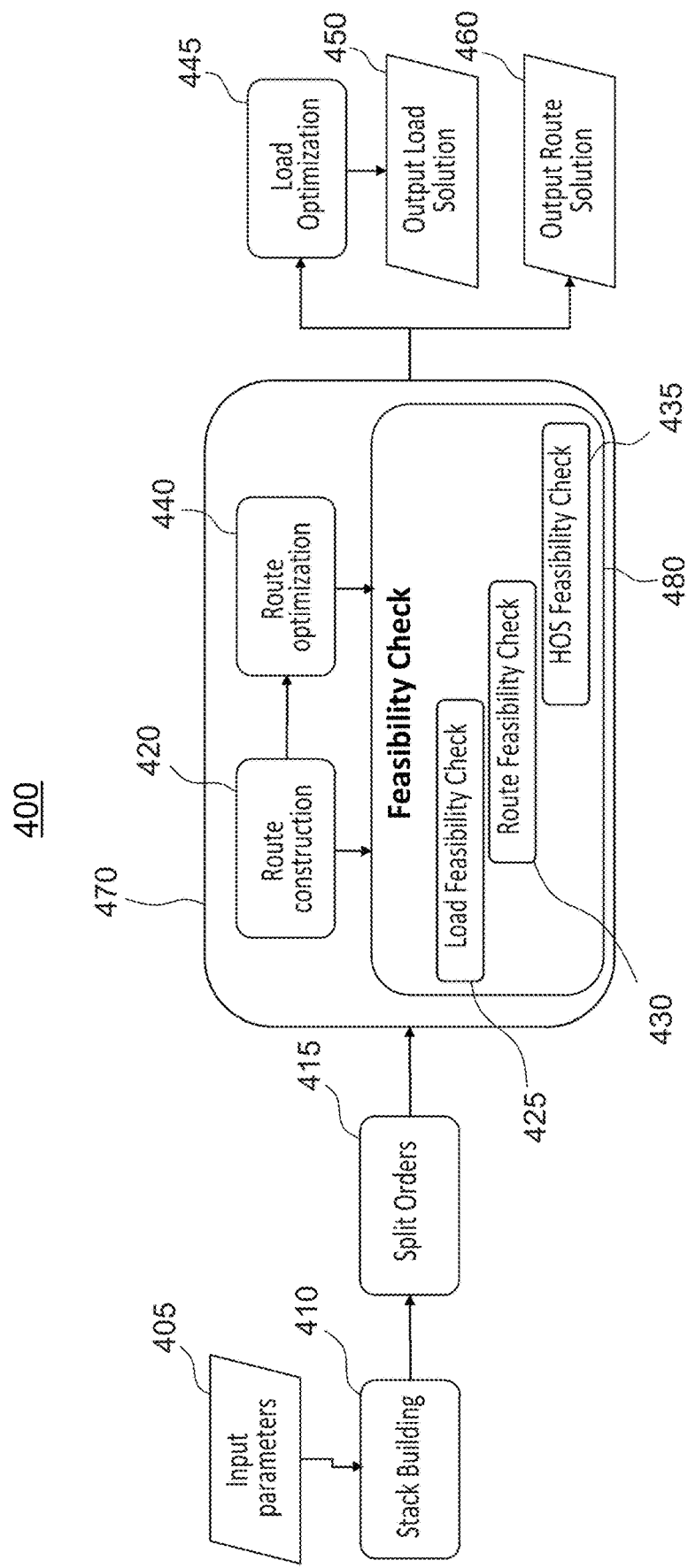
FIG. 4 illustrates a block diagram for a method of acts, modules, and outputs, which can be employed for automatic generation of a load and route plan, according to an embodiment.

Turning ahead in the drawings, FIG. 4 illustrates a block diagram for a method 400 of acts, modules, and outputs, which can be employed for automatic generation of a load and route plan, according to an embodiment. In several embodiments, method 400 also can be employed for automatic generation of an offshore load and route plan including stop sequences mapped to offshore locations. The automatic generation of an offshore load and route plan can be similar or identical to the automatic generation of load and route design and activities shown and described in U.S. patent application Ser. No. 16/777,498, filed Jan. 30, 2020 (referred to herein as the "'498 Patent Application"), and the '498 Patent Application is incorporated herein by reference in its entirety. Various activities associated with method 400 can similar or identical to various activities described in the '498 Patent Application.

In several embodiments, method 400 can be employed in many different embodiments or examples not specifically depicted or described herein. In some embodiments, the procedures, the processes, and/or the activities of method 400 can be performed in the order presented or in parallel. In a number of embodiments, certain elements of method 400 can perform, involve, and/or be generated by various procedures, processes, and/or activities. In other embodiments, the procedures, the processes, and/or the activities of method 400 can be performed by, and the outputs can be generated by, other suitable elements of method 400. In several embodiments, procedures, the processes, and/or the activities of method 400 can be performed in any suitable order. In still other embodiments, one or more of the procedures, the processes, and/or the activities of method 400 can be combined or skipped. In several embodiments, offshore route design system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as offshore route design system 300 (FIG. 3). The processor(s) can be similar or identical to the processor(s) described above with respect to computer system 100 (FIG. 1).

In many embodiments, method 400 can include a block 405 of receiving input parameters that can be used in generating a load plan. Various activities associated with block 405 can be similar or identical to various activities described in the '498 Patent Application. In many embodiments, method 400 can proceed after block 405 to a block 410.

In some embodiments, method 400 can include block 410 of building stacks can be employed to build stacks of pallets based on a number of orders for delivery to another location, such as stores located in an overseas location or near a port. Various activities associated with block 410 can be similar or identical to various activities described in the '498 Patent Application. In several embodiments, method 400 can proceed after block 410 to a block 415.

In a number of embodiments, method 400 can include block 415 of splitting orders. Various activities associated with block 415 can be similar or identical to various activities described in the '498 Patent Application. In some embodiments, method 400 can proceed after block 415 to a block 470.

In several embodiments, method 400 can include block 470 of constructing offshore route plans and optimizing offshore route plans. In many embodiments, block 470 can include a block 420, a block 440, and a block 480, as described in further detail below. Various activities associated with block 470 can be similar or identical to various activities described in the '498 Patent Application.

In some embodiments, block 470 can include block 420 of constructing a route based on the input parameters (block 405) of the orders. In many embodiments, block 405 also can include inputting additional stores and/or stops in a sequence of service locations, such as a port and/or a port location. In some embodiments, more than one store can be (i) serviced by and/or (ii) connected to each port location. In various embodiments, a port location can be an entry point connected to a location or an island. In some embodiments, the port can be located near or at (i) a location within the contiguous United States (e.g., Mainland), (ii) an island, and/or another suitable location where a port is used to service stores. Various activities associated with block 420 can be similar or identical to various activities described in the '498 Patent Application.

In various embodiments, block 420 can include receiving the data from tracking or measuring a distance between one service location to a port and/or and other service locations. In some embodiments, a distance matrix can involve measuring distances travelled between each store within the sequence of stores. In several embodiments, the stores on each route can include multiple store rules to satisfy as part of the input parameters. In some embodiments, store rules can apply to weight and load restrictions and/or limits allowed on the premises. In various embodiments, block 420 can determine, via store rules, whether or not the stop is aligned with store time windows to accept deliveries and/or allow pickups.

In various embodiments, block 420 can include determining, via store rules, include whether or not a store allows the use of day cab tractors during a visit. In many embodiments, the store rules also can prohibit the use of sleeper cab tractors and/or another tractor-trailer model. Generally, a day cab tractor can refer to tractors (i.e., tractor-trailer sets) that do not have a sleeper cab. In various embodiments, store locations can be designed and/or built to support the weight limits and/or dimensions associated with the day cab tractor-trailer sets while operated on store premises preventing structure damage to the premises or creating an unsafe environment during a delivery or pick up by the driver. Similarly, in several embodiments, store rules that the heavier and/or longer length dimensions of a sleeper tractor-trailer set up can also involve preventing damage and avoiding unsafe operations. In many embodiments, store rules can involve safety limitations for personnel, other tractor-trailers, and/or another type of damage.

In various embodiments, block 470 can include block 440 of optimizing a route based on the constructed routes. Various activities associated with block 440 can be similar or identical to various activities described in the '498 patent.

In several embodiments, block 470 can include block 480 of conducting one or more feasibility checks on the constructed route. The load feasibility check and the route feasibility check can be similar or identical to the load feasibility check and the route feasibility check activities shown and described in U.S. patent application Ser. No. 17/163,428, filed Jan. 30, 2021 (referred to herein as the "'428 Patent Application"), and the '428 Patent Application is incorporated herein by reference in its entirety.

In many embodiments, block 480 can include three feasibility checks, block 425, block 430, and/or block 435. Block 425, block 430, and/or block 435 are further described below. In various embodiments, block 480 also can run a number of predetermined iterations of each feasibility check of the three feasibility checks until the predetermined number of iterations expire and/or one or more constructed routes are designated as feasible. In many embodiments, each iteration learns from the data in each previous iteration as a feedback loop where the computer learns from each infeasible outcome. Various activities associated with block 480 can be similar or identical to various activities described in the '428 Patent Application.

In many embodiments, block 480 can include block 425 of conducting a load feasibility check. Various activities associated with block 425 can be similar or identical to various activities described in the '428 Patent Application.

In some embodiments, block 480 can include block 430 of conducting a route feasibility check. Various activities associated with block 430 can be similar or identical to various activities described in the '428 Patent Application.

In several embodiments, block 480 can include block 435 of conducting an HOS feasibility check. In some embodiments, block 435 further can include HOS rules (e.g., regulations) for drivers enforced by the Department of Transportation (DOT), such as the DOT regulations promulgated in Title 49, U.S. Code of Federal Regulations, Parts 300-399 and/or another suitable regulation. In various embodiments, HOS rules refer to a maximum amount of time drivers are permitted to be on-duty which includes driving time. Further, HOS rules specify a number of rest periods and a length of time of those rest periods for carriers and drivers operating commercial motor vehicles. In many embodiments, the HOS rules for property-carrying drivers can include driving time limits, on-duty limits, short-haul exceptions, adverse driving condition exceptions, break periods, sleeper berth exceptions, and/or another HOS rule. In a number of embodiments, tracking driver time operating a tractor-trailer vehicle can include an on-duty duration metric and a non-sleep duration metric, where on-duty duration metrics and driver time metrics can involve different activities tracked separately.

In some embodiments, block 435 can include running an enhanced HOS feasibility check to reset driver hours of service during one or more service segments in an offshore route plan, where each service segment in an offshore route plan refers to travelling from one store to the next store or port. In several embodiments, drivers operate ground transport (e.g., commercial vehicles) on service segments that are connected by land. For example, a sequence of service offshore route plan can be:

Depot→Store A→Port→Store B→Depot

In this sequence of service offshore route plan, a driver transports the tractor load to all service segments that are connect by land, service segment by service segment, whereas, service segments connect to a Port, located overseas can involve shifting transport from ground transport to using non-ground transport vehicles where the drive time for a driver is reset to zero for those segments.

In many embodiments, offshore route plans can include non-ground transportation modes (e.g., vehicles, vessels) such as ocean transport, air transport, and/or another suitable method of transport to one port to another port. In several embodiments, the offshore route plans can include travel to a port to other ports. In many embodiments, the offshore route plans can include inter-island travel from an island to other islands where one or more ports can be located on each island and one or more stores can be serviced or connected to each port on a respective island. In various embodiments, when inter-island travel can include island hopping, where the enhanced HOS feasibility check resets the drive states (HOS) to zero each time upon travelling a port on an island and restarts upon arrival at the port on the island. For example, the HOS service hours tracked for each drive state or each drive state that is part of a team of drivers can start when a driver begins the offshore route plan and ends when the driver ends the offshore route plan.

In many embodiments, in the case of transportation via overseas transport or air transport, the HOS driver states can be reset to zero as part of the enhanced HOS feasibility check. In a number of embodiments, block 435 of HOS feasibility check can involve determining whether an offshore route plan is feasible based on rules, such as the U.S. DOT regulations. Various activities associated with block 435 can be similar or identical to various activities described in the '498 Patent Application.

In some embodiments, a team of drivers can be used to transport (e.g., move) pallets and stacks for MP commodity types (e.g., "MP" can include meats and produce) using a tractor-trailer set up from a store to store connected over land, such as land over the contiguous United States and/or another land location. In various embodiments, a tractor-trailer set up can include a day cab tractor or a sleeper cab tractor and multiple types of trailers used to transport pallets and stack over land that is part of the offshore route plan. In a number of embodiments, block 435 can be similar or identical to the activities described below in connection with FIG. 5. In several embodiments, method 400 can proceed after block 470 to a block 445, a block 450, and/or a block 460.

In several embodiments, method 400 can include block 445 of optimizing a load. Various activities associated with block 445 can be similar or identical to various activities in the '428 Patent Application. In several embodiments, block 445 can produce an optimized load plan in which to stack the pallets and/or stacks that can fulfill the order to physical stores (e.g., 361-363 (FIG. 3)) and/or distribution center (e.g., 350 (FIG. 3)). In some embodiments, the optimized load plan can be input as data to generate a loading plan solution, such as in block 450 of outputting a load solution. In several embodiments, method 400 can proceed after block 445 to a block 450.

In various embodiments, method 400 can include block 450 of outputting the load solution based on a type of tractor-trailer set up. Various activities associated with block 450 can be similar or identical various activities described in the '428 Patent Application.

In many embodiments, block 470 further can proceed to block 460 of outputting a route solution. In several embodiments, an output route solution can include a sequence of service locations in a route plan and/or an offshore route plan. In some embodiments, block 460 can be implemented as described below in connection with block 730 of FIG. 7.

Figure 5:
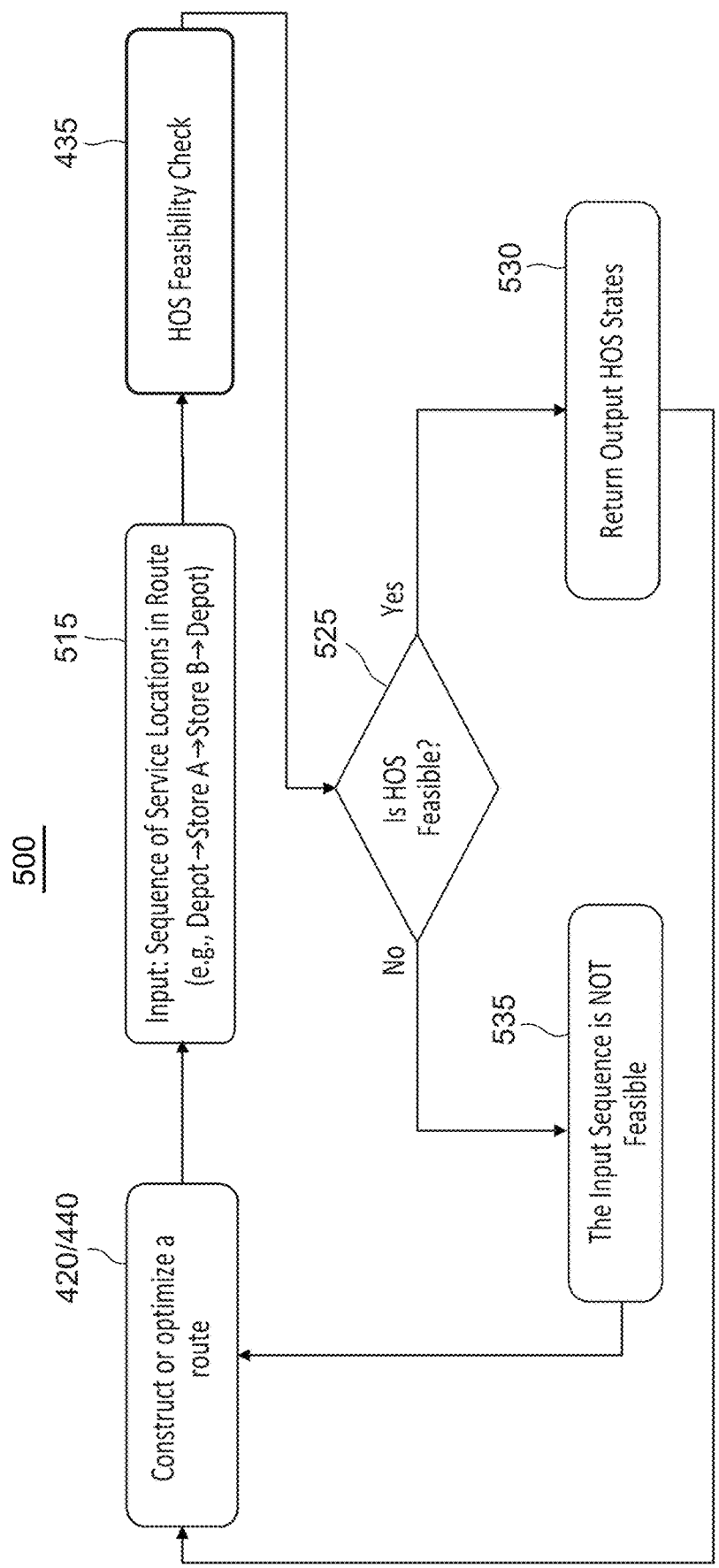
FIG. 5 illustrates a flow chart for a method of running a feasibility check feedback loop to optimize an in offshore route plan, according to an embodiment.

Moving ahead in the drawings, FIG. 5 illustrates a flow chart for a method 500 of running a feasibility check feedback loop to optimize an in offshore route plan, according to an embodiment. Method 500 is merely exemplary and is not limited to the embodiments presented herein. Method 500 can be employed in many different embodiments or examples not specifically depicted or described herein. In several embodiments, the procedures, the processes, and/or the activities of method 500 can be performed in the order presented. In a number of embodiments, certain elements of method 500 can perform, involve, and/or be generated by various procedures, processes, and/or activities. In other embodiments, the procedures, processes, and/or the activities of method 500 can be performed in any suitable order. In still other embodiments, one or more of the procedures, the processes, and/or the activities of method 500 can be combined or skipped. In several embodiments, offshore route design system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as offshore route design system 300 (FIG. 3). The processor(s) can be similar or identical to the processor(s) described above with respect to computer system 100 (FIG. 1).

In some embodiments, method 500 can include a block 515 of inputting a sequence of service locations in a route plan (e.g., route). In some embodiments, block 515 can include receiving data from multiple types of data metrics and/or rules subject to each store that is part of a sequence of stores for a driver to visit via an offshore route plan. For example, a store can include a distribution center (e.g., 350 (FIG. 3)), a warehouse, a physical store (e.g., 361-363 (FIG. 3)), a store connected to a port, a store on an island, and/or another suitable location receiving deliveries and/or pickups. In several embodiments, the multiple types of data metrics and/or rules can include store rules, port locations, drive rules, distance matrices, and/or another suitable constraint for each store mapped out on the offshore route plan. In various embodiments, store rules can include restraints on tractor, constraints on delivery time windows, and/or another suitable rule.

In various embodiments, a number of destination stops identified on an initial offshore route plan may destinations stops with ports, air transportation, ocean transport, island to island transport, and/or another style of transport other than transportation via a type of tractor-trailer set up.

For example, an exemplary offshore route plan sequence can include 4 destination stops such as Depot→Store A→Store B→Depot. In such a sequence, the route begins at the Depot, then travels to service location (e.g., Store A) to the next service location (e.g., Store B) and returns back to the Depot. Various activities of block 515 can be similar or identical to the various activities described above in connection with block 460 (FIG. 4). In several embodiments, block 435 can proceed after block 515 to block 435 (FIG. 4).

In a number of embodiments, method 500 can include block 435 (FIG. 4) of running a HOS feasibility check on an iteration of the sequence of service locations of block 515. In various embodiments, block 435 (FIG. 4) can determine whether the sequence of locations for a driver or a team of drivers comply with the HOS rules by analyzing a distance between each stop against the threshold of driver states via the HOS rules. In several embodiments, block 435 (FIG. 4) can involve running iterations of HOS feasibility checks as part of a feedback loop for infeasible input sequences by using the data gained from previous iterations of HOS feasibility checks. In a number of embodiments, additional HOS feasibility checks can be run for routes containing Day Cab Stores. In some embodiments, method 500 can proceed after block 435 (FIG. 4) to a block 525.

In various embodiments, method 500 can include block 525 of determining whether or not each sequence of service location for a respective iteration of the offshore route plan complies with the HOS rules. If block 525 is yes, method 500 can proceed to block 530 returning a feasible offshore route plan as an optimized route similar or identical to block 440 (FIG. 4). If block 525 is no, method 500 can proceed to a block 535 of returning an infeasible sequence of service location for the offshore route plan that violates one or more HOS rules. Various embodiments associated with block 525 can be similar or identical to the various activities in connection with the '428 Patent Application. In many embodiments, method 500 can proceed after block 535 to block 420 (FIG. 4) to construct a new iteration of block 515.

In several embodiments, method 500 can include block 420 (FIG. 4) of constructing an offshore route. In many embodiments, method 500 also can include a block 440 of optimizing the offshore route. In some embodiments, block 420 and block 440 each can involve using one or more processors to (i) add each set of data for each input from a respective prior HOS feasibility check (block 435 (FIG. 4)), and/or (ii) to construct a new input sequence of location for an offshore route plan via block 420 (FIG. 4). In various embodiments, block 420 (FIG. 4) can be run as a series of iterations where data from each past iteration is used to teach and/or learn from the next iteration of a sequence of service locations for the offshore route plan. In many embodiments, method 500 can repeat the HOS feasibility check of each sequence of service location offshore route plan until block 530 is satisfied and/or until a predetermined number of iterations have been run, then method 500 can terminate. Various activities associated with block 530 that can be similar or identical to the various activities of the '428 Patent Application.

Figure 6:
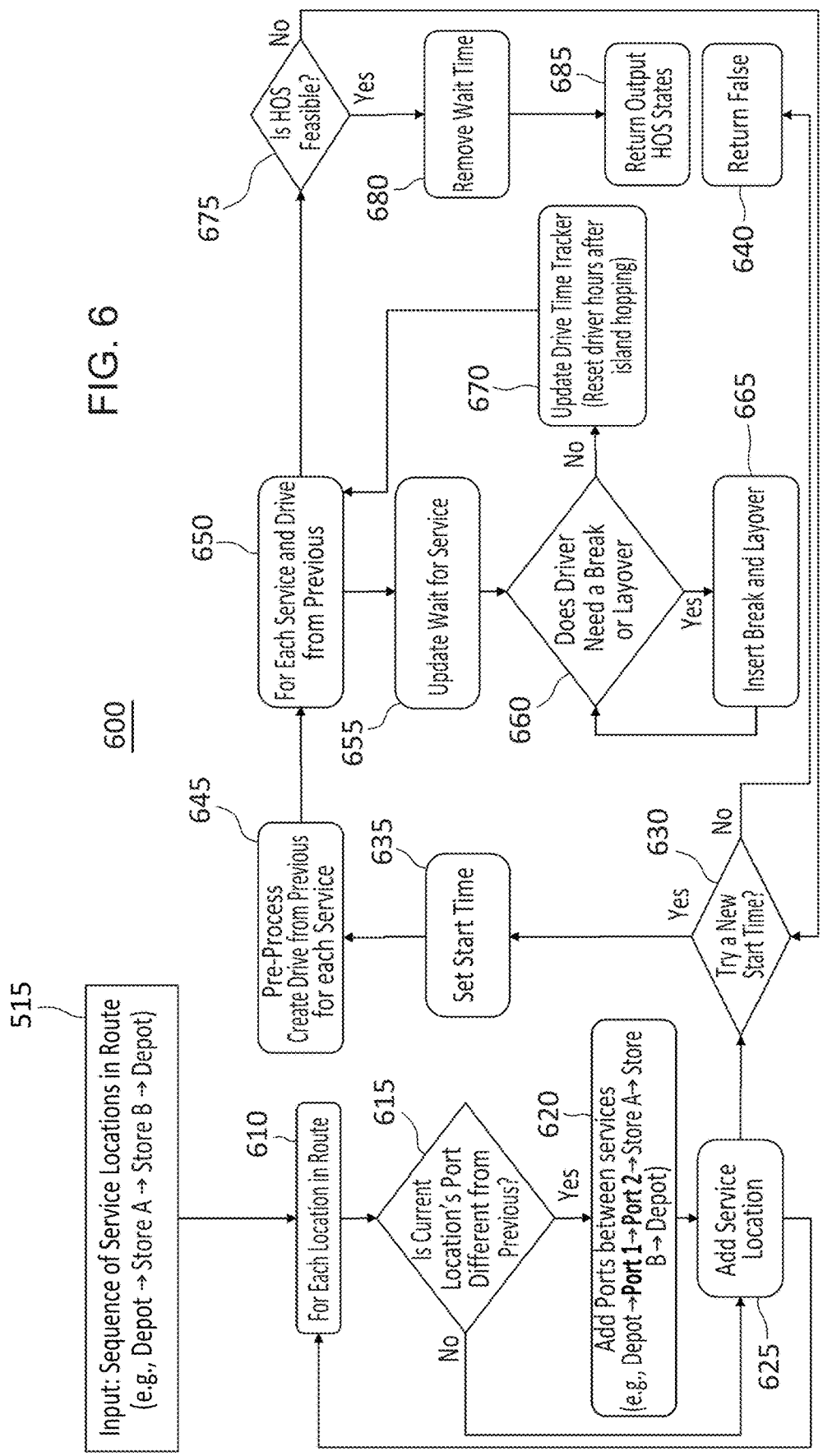
FIG. 6 illustrates a flow chart for a method of running feasibility checks for each service location of an offshore route plan, according to an embodiment.

Turning ahead in the drawings, FIG. 6 illustrates a flow chart for a method 600 of running feasibility checks for each service location sequenced in a respective offshore route plan, according to an embodiment. Method 600 is merely exemplary and is not limited to the embodiments presented herein. Method 600 can be employed in many different embodiments and/or examples not specifically depicted or described herein. In several embodiments, the procedures, the processes, and/or the activities of method 600 can be performed in the order presented. In other embodiments, the procedures, processes, and/or the activities of method 600 can be performed in any suitable order. In still other embodiments, one or more of the procedures, the processes, and/or the activities can be combined or skipped. In several embodiments, offshore route design system 300 (FIG. 3) can be suitable to perform method 600 and/or one or more of the activities of method 600. In some embodiments, the sequence of service locations can be similar or identical to the activities described above in connection with block 515 (FIG. 5).

In these or other embodiments, one or more of the activities of method 600 can be implemented as one or more computing instructions configured to run at one or more processors and configured to be stored at one or more non-transitory computer-readable media. Such non-transitory computer-readable media can be part of a computer system such as offshore route design system 300 (FIG. 3). The processor(s) can be similar or identical to the processor(s) described above with respect to computer system 100 (FIG. 1).

In various embodiments, method 600 can begin with block 515 (FIG. 5) of inputting a sequence of service locations for an offshore route plan. In several embodiments, the sequence of service locations for the offshore route plan can be one of multiple iterations of the sequence of service locations subject to multiple constraints. For example, such a constraint can include adding a port to a service location in the sequence, adding a new driver state, adding a new start time, updating a drive time tracker, inserting a layover, and/or another suitable constraint effecting the feasibility of the offshore route plan. In some embodiments, method 600 can proceed after block 515 (FIG. 5) to a block 610.

In some embodiments, method 600 can include block 610 of creating input data for driver HOS states by analyzing each location in the offshore route plan. In many embodiments, block 610 can involve determining a drive state for each portion of the sequence of locations. For example, determining a drive state from a distance travelled from a distribution center (e.g., a Depot) to Store A can create a drive state based on HOS rules and constraints. In several embodiments, a drive state can be applied to each driver as part of a team of drivers. For example, Driver A can drive a distance tracked by a time tracker between two service locations, thus when the time tracker exceeds a maximum drive time, a drive state such as a break or layover can be added in compliance with the HOS rules. At the end of that time window another driver in the team of drivers can switch out driving roles to complete a distance remaining in the time window and/or start the next time portion of the sequence of service locations while staying in compliance with HOS rules. Various embodiments associated with block 610 can be similar or identical to various activities described in the '498 Patent Application. In various embodiments, method 600 can proceed after block 610 to a block 615.

In a number of embodiments, method 600 also can include block 615 of determining whether there are more than one port between two service locations by analyzing whether a first port is different from a second port between two service locations. For example, one or more ports that service one or more stores in a sequence of stores can include transportation travel other than ground transportation, such as air transport, ocean transport, island to island (e.g., island hopping), and/or another suitable transportation method. If block 615 is yes, method 600 can proceed to a block 620. Otherwise, block 615 is no, method 600 can skip block 620 and proceed to a block 625.

Figure 7:
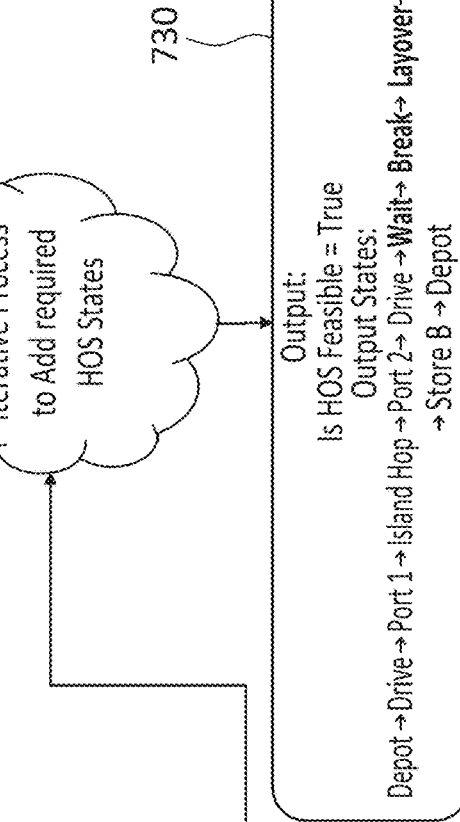
FIG. 7 illustrates a flow chart for a method of iterating multiple HOS feasibility checks after each addition of one or more driver states in a respective sequence of service location iteration in an offshore route plan, according to an embodiment.

In various embodiments, when there is one or more ports between two service locations, method 600 can include block 620 of adding the one or more ports between service locations and modifying the offshore route plan. For example, an offshore route plan can include two port location stops between a Depot and a Store A as part of the sequence of service locations: Depot→Port 1→Port 2→Store A→Store B→Depot. In some embodiments, modifications to the offshore route plan can include modifying driver states, start times, and/or other feasibility checks, as shown in FIG. 7 and described below. In several embodiments, method 600 can proceed after block 620 to block 625.

In a number of embodiments, method 600 can include block 625 of adding a new service location to the sequence of service locations. In several embodiments, block 625 can involve returning to block 610 for additional processing. In several embodiments, each service location along the sequence of service locations can involve adding additional stops for each store triggering a new HOS feasibility check be run to determine where the existing offshore route plan violates any HOS rules by the addition of one or more stops.

In some embodiments, block 610 can involve generating (e.g., creating) another iteration of input data for driver HOS states including the new service locations received from block 620. In various embodiments, data generated from block 620 can be used as feedback for the next iteration to update and/or tune a new service location in the offshore route plan. In several embodiments, method 600 can proceed after block 625 to a block 630.

In a number of embodiments, method 600 can include block 630 of determining whether to add a new start time for each service location and/or each new iteration of an offshore route plan. If block 630 is yes, method 600 can proceed to a block 635. Otherwise block 630 is no, method 600 can proceed to block 640 of returning an infeasible offshore route plan or returning to false. In many embodiments, block 640 can involve discarding a particular iteration of each service location modified to add one or more service locations to the offshore route plan.

In various embodiments, method 600 can include block 635 of setting a start time for a modified service location of the sequence of service locations. In some embodiments, method 600 can proceed after block 635 to a block 645.

In several embodiments, method 600 also can include block 645 of preprocessing each modified service location with a new start time. In various embodiments, block 645 also can involve creating another drive state using a previous drive state for each service location. In some embodiments, block 645 further can involve an iterative process to add an HOS using an inside HOS feasibility check feedback loop.

In various embodiments, the inside HOS feasibility loop can involve an outer loop to update a driver time tracker function based on one or more stop locations added to the offshore route plan. In several embodiments, the inside HOS feasibility loop also can involve an inner loop to insert other driver states, such as a break or a layover, via the HOS rules. In various embodiments, updating the driver time tracker function (e.g., outer loop) can involve using feedback from the inner loop. For example, driver states can include drive time duration time periods, such as drive time, on-duty time, non-sleep durations of time, and/or another suitable period of time). In many embodiments, data from each of the drive time duration time periods can be used as input to update the drive time tracker function by inserting a break and/or a layover function. Various activities associated with block 645 can be similar or identical to the various activities of the '428 Patent Application. In some embodiments, method 600 can proceed after block 645 to a block 650.

In some embodiments, method 600 can include block 650 of processing data for each service location and drive state from one or more previous service locations. Various activities associated with block 650 can be similar or identical to the various activities of the '428 Patent Application. In various embodiments, method 600 can proceed after block 650 to block 655 of generating a wait time between service locations that can be used to update driver states based on additional data. Various activities associated with block 655 can be similar or identical to the various activities of the '428 Patent Application. In some embodiments, method 600 can proceed after block 655 to block 660.

In a number of embodiments, method 600 can include block 660 of determining whether to include a break time period and/or a layover time period for each driver or a team of drivers. If block 660 is yes, method 600 can proceed to block 665 of inserting a break time and/or a layover period into each service location. In various embodiments, block 665 can return to block 660 for further iterative processing. Various activities associated with block 660 can be similar or identical to the various activities of the '428 Patent Application. If block 660 is no, method 600 can proceed to block 670.

In several embodiments, method 600 can include block 670 of updating a drive time tracker by resetting driver hours for each alternative transportation method of each service location, such as air transport or ocean transport. In various embodiments, drive time trackers track ground transport period of time for each driver or team of drivers to determine when a break or layover (e.g., a drive state) for a driver should be inserted as part of the offshore route plan.

In some embodiments, drive time trackers zero out or restart each time ground transportation is delayed or not used as part of the sequence of service locations in an offshore route plan. In many embodiments, determining whether an offshore route plan is feasible can be contingent on the drive HOS states for ground transportation a section or a leg of the offshore route plan. For example, the section of the offshore route plan can include a port on an island where the port services Store A and Store B. Drive time tracking for each driver resets to zero for each ground transportation leg of the offshore route plan since the driver is not transporting the items via an ocean transport or an air transport. In several embodiments, after updating the drive time tracker, block 670 also can return to block 650 to update each service location and drive states using the data gathered from updating block 670. Various activities associated with block 670 can be similar or identical to the various activities of the '428 Patent Application. In some embodiments, method 600 can proceed after block 650, as updated from block 670, to a block 675.

In a number of embodiments, method 600 can include block 675 of determining whether the updated service location is feasible via the HOS rules. In some embodiments, determining whether a sequence of service locations comply with the HOS rules can include an HOS feasibility check, similar or identical to activities performed in HOS feasibility check (block 435 (FIG. 4)). If block 675 is yes, method 600 can proceed to a block 680 of removing a wait time from the modified iteration of the sequence of service locations. If block 675 is no, method 600 can return to block 630 of trying a new start time or returning to false via block 640. Various activities associated with block 675 can be similar or identical to the various activities of the '428 Patent Application In several embodiments, method 600 can proceed after block 680 to a block 685.

In various embodiments, method 600 can include block 685 of returning an output of HOS driver states that are feasible for the sequence of service locations, as modified. Various activities associated with block 685 can be similar or identical to the various activities of the '428 Patent Application.

Moving forward in the drawings, FIG. 7 illustrates a flow chart for a method 700 of iterating multiple HOS feasibility checks after each addition of one or more driver states in a respective sequence of service location iteration in an offshore route plan, according to an embodiment. Method 700 also can be employed in many different embodiments or examples not specifically depicted or described herein.

In some embodiments, the procedures, the processes, and/or the activities of method 700 can be performed in the order presented or in parallel. In other embodiments, the procedures, the processes, and/or the activities of method 700 can be performed in any suitable order. In still other embodiments, one or more of the procedures, the processes, and/or the activities of method 700 can be combined or skipped. In several embodiments, offshore route design system 300 (FIG. 3) can be suitable to perform method 700 and/or one or more of the activities of method 700.

In these or other embodiments, one or more of the activities of method 700 can be implemented as one or more computing instructions configured to run at one or more processors and configured to be stored at one or more non-transitory computer-readable media. Such non-transitory computer-readable media can be part of a computer system such as offshore route design system 300 (FIG. 3). The processor(s) can be similar or identical to the processor(s) described above with respect to computer system 100 (FIG. 1).

In some embodiments, method 700 can begin with block 515 (FIG. 5) of inputting an initial sequence of service locations in an offshore route plan. In this example, the initial input of an exemplary offshore route plan can includes four stop sequences (e.g., stores) in a sequential order indicating there is a start time and a stop time between two stores in the sequence:

Depot→Store A→Store B→Depot

In following this example, this route starts at a Depot location at a first start time then travels a distance between the Depot and Store A culminating with a first stop time. Further, calculating a second start time and stop time for the distance travelled from Store A to Store B, and so forth for the remainder of the stores in the sequence of service locations. In this example, the offshore route plan starts at a Depot location and returns to the same Depot location. In various embodiments, transporting goods (e.g., orders, items) to each location in an offshore route plan can employ an interplay between using one or more modes of transportation to transport the goods to locations beyond the contiguous states of the United States.

In various embodiments, method 700 can include block 710 of adding two consecutive ports to the initial offshore route plan. In several embodiments, block 710 also can include adding two ports between two stores. In some embodiments, by adding the additional stops and additional modes of transport, another set of drive states also can be added to update a modified or optimized offshore route plan:

Depot→Port 1→Port 2→Store A→Store B→Depot

At this point, the start time 715 for each store in the sequence is set at zero. In this example, after adding the two ports, the offshore route plan can be pre-processed to include transportation modes from one location to the next location, such as ground transportation (e.g., tractor trailer set ups) between stores, ocean transport (e.g., ocean vessels), air transport (e.g., air planes). In some embodiments, method 700 can proceed after block 710 to a block 720.

In various embodiments, method 700 can include block 720 of after pre-processing the initial offshore route plan, modifying or optimizing the route. In some embodiments, the modified or optimized route can include:

Depot→Drive→Port 1→Island Hop→Port 2→Drive→Store A→Drive→Store B→Depot where the term "Drive" refers to ground transportation and the term "Island Hop" refers to ocean/air transportation from the U.S. mainland state to an island or from one island to another island As another example, a tractor-trailer arrives at the first store, a Depot, and loads the assigned orders and/or cargo for transport to Port 1 located on a state in the United States. Once the ground transportation reaches Port 1, the drive time stops. After reaching Port 1 located on land, the load of goods are transported by an ocean vessel to a Port 2 which is located on an island. During the ocean/air transport time, the driver time is reset to zero via HOS rules. Once the ocean vessel reaches Port 2, the goods can be loaded to another ground transportation mode to travel to Store A which is serviced by Port 2, which starts the drive time from zero via HOS rules. Next, using ground transportation, the load can be transported from Store A to Store B back to the Depot. In many embodiments, method 700 can proceed after block 720 to a block 725.

In several embodiments, method 700 can include block 725 of iterating the pre-processed offshore route plan. In some embodiments, block 725 can perform a predetermined number of iterations to add the required HOS states and/or until one or more off-shore routes complies with the HOS rules for a drive time. In various embodiments, block 725 can also include triggering a process of iterations of HOS feasibility checks to determine whether the existing offshore route plan complies and/or violates any HOS rules by the addition of drive states.

In several embodiments, the iterative process answers the question: Is the HOS feasible: True or False. If the HOS is feasible, the return is True, otherwise False. In many embodiments, method 700 can proceed after block 725 to a block 730.

In various embodiments, method 700 further can include block 730 of receiving an output of driver states. In several embodiments, block 730 further can determine whether or not the HOS is feasible by returning an output of True. If the HOS is feasible, block 730 can output an updated offshore route plan outlined as follows:

Depot→Drive→Port 1→Island Hop→Port 2→Drive-
→Wait→Break→Layover→Store A→Drive→S-
tore B→Depot where there term "wait" refers to a wait time for the vehicle, the term "break" refers to a short time period (e.g., 30 minutes, 1 hour) for the driver to rest or refrain from driving during that time period, and the term "layover" refers to a longer time period (e.g., 8 hours, 12 hours, or another suitable time period) for the driver to sleep and/or fully rest before resuming a drive state of "Drive."

Figure 8:
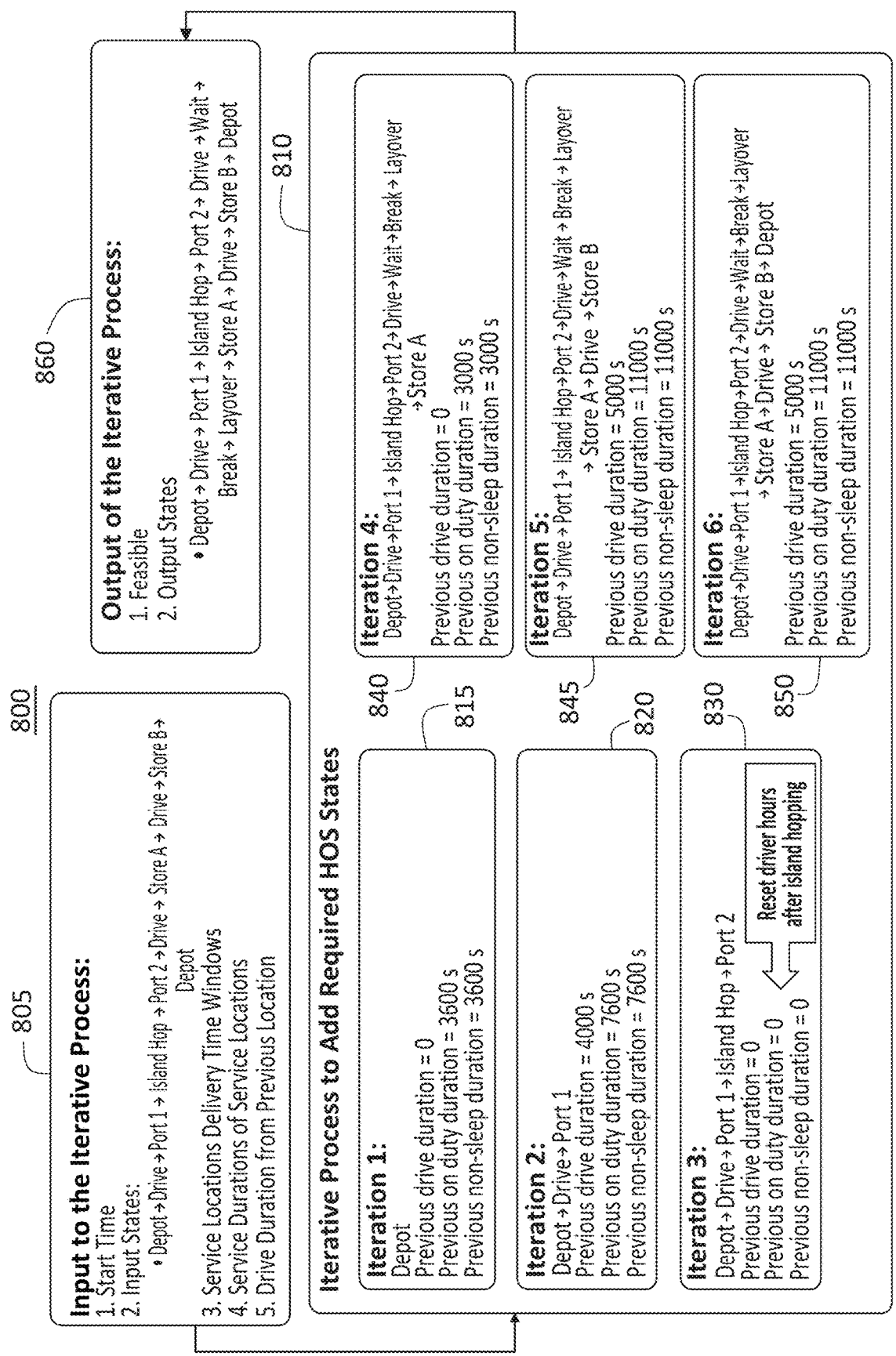
FIG. 8 illustrates an exemplary iterative process of adding HOS states in an offshore route plan, according to an embodiment.

Turning ahead in the drawings, FIG. 8 illustrates an exemplary iterative process 800 of adding HOS states in an offshore route plan, according to an embodiment. Iterative process 800 begins with a block 805 of receiving one or more data metrics (e.g., inputs) to feed into this iterative process of adding driver states for each stop along the offshore route plan. In several embodiments, data metrics can be obtained by including tracking one or more durations of one or more time windows such as delivery time windows, service durations, and drive time durations. In many embodiments, data metrics used as input can include the following exemplary types of data, such as (a) a start time for each distance between two service locations, (b) driver states for each service location, (c) delivery time windows for each service location, (d) service duration time periods of each service location, (e) drive time duration from a previous service location, and/or another suitable type of data associated with drive states. In following this example, the following service locations for an exemplary offshore route plan can be illustrated as follows:

Depot→Drive→Port 1→Island Hop→Port 2→Drive-
→Store A→Drive→Store B→Depot where in this exemplary offshore route plan, each service location segment can include a distance between each service location and one or more activities associated with a picking up items and/or delivering items before proceeding to the next service location segment. For example, there are six service locations, such as a Depot, Port 1, Port 2, Store A, Store B, and return to the Depot. Each service location can be time tracked as a segment from one service location to the next service location, such as a Depot location to a Port 1 location is one service segment of the offshore route plan. Another service segment can include a Depot location to a Port location to a Port 2 location. In this example, there are also four segments indicating a type transport activity can be time tracked between each service location (e.g., drive, island hop). Based on HOS rules, ground transportation activities are time tracked to determine whether to insert additional drive states along each segment. When other transport activities are used to transport the load between service locations, the driver states reset to zero based on the HOS rules. Such other transportation activities can include air transportation and/or ocean vessel transportation. Iterative process 800 can proceed after block 805 to a block 810.

Iterative process 800 includes block 810 of iterating each service segment to determine whether to add one or more driver states. Each service segment learns from previous iterations of previous segments in a cumulative process. Each iteration can include multiple service segment tracking time durations by seconds, minutes, hours, and/or another suitable time tracking metric. Such time durations can include tracking time drive durations across each segment.

In the example shown in FIG. 8, iterative process 800 runs for 6 iterations (blocks 815, 820, 830, 840, 845, and 850). Each tracking time duration for each previous iteration is cumulatively added to the next iteration. Each iteration can output either adding driver states or resetting a time duration to zero depending on the transport vehicle used to complete the next service segment. Each iteration for a respective segment can involve tracking time periods for each driver cumulatively based on HOS rules. Each respective segment can involve transporting a load from the start of one service location to the next service location. Tracking driver activities can include: a previous drive duration, a previous on duty duration, and a previous non-sleep duration.

At block 815 (Iteration 1) of iterating an initial service segment, the initial service segment can begin with a Depot (e.g., store or warehouse) where the drive duration is set to zero. In some embodiments, a previous drive duration time can register as zero time units can indicate the start or beginning of a first iteration in an iterative process, similar to identical to the iterative process to add HOS states as shown in block 810, and described above. In many embodiments, a previous drive duration time that is reset to zero time units can indicate a change in a transport modality or vehicle between one or more service segments. Such a change in transport modality can involve a ground transport tractor arrives at a service location and transfers tractor or item load to an ocean vessel transport and/or an air vessel transport. In some embodiments, resetting a previous drive duration time to zero time units can involve island hopping from one port to another port located on different island locations. In block 815, tracking time units for block 815 as shown in FIG. 8, and described as including a previous drive duration of zero time units, a previous on duty duration of 3,600 s, and a previous non-sleep duration of 3,600 s, where s can represent a time unit in seconds and/or represent another predetermined time unit. Block 810 can proceed after block 815 to a block 820 (Iteration 2).

At block 820 (Iteration 2) of iterating a second service segment, the first service segment and the second service segment covers a distance travelled from the Depot→then adding→Drive→Port 1. In some embodiments, a service segment between two service locations that ends or arrives at a Port location can indicate an upcoming transport modality change to travel to the next service segment and a potential for new driver states to be added. In block 820, tracking time units as shown in FIG. 8, and described as including a previous drive duration of 4,000 s, a previous on duty duration of 7,600 s. In several embodiments, each of the time metrics tracked from each previous service segment can be rolled over to the next service segment and updated as shown in FIG. 8 and described. Block 810 can proceed after block 820 to a block 830 (Iteration 3).

At block 830 (Iteration 3) of iterating a third service segment including an island hopping service segment where the previous drive duration is reset to zero after the island hopping service segment terminates, the third service segment covers the first service segment and the second service segment as cumulatively travelled a distance from Depot-→Drive→Port 1 and adding→Island hopping→Port 2. In various embodiments, island hopping can indicate a non-ground transport modality to a Port 1 located on an island then continuing the service segment to Port 2 located on another island. In several embodiments, tracking time units can be particular to tracking drive times for a driver or a driver that is part of a team of drivers using ground transport modalities, such as day cab tractor or a sleeper cab tractor over a drive duration time period. Block 810 can proceed after block 830 to a block 840 (Iteration 4).

At block 840 (Iteration 4) of iterating a fourth service segment where the previous drive duration starts at zero time units and new driver states are added in compliance with HOS rules, the fourth service segment covers the first service segment, the second service segment, and the third service segment as cumulatively travelled the distance from Depot→Drive→Port 1→Island hopping→Port 2 and adds drive states→Drive→Wait→Break→Layover→Store A. In many embodiments, adding driver states such as a break or a layover can involve complying with one or more HOS rules for driver or compliance with store rules and/or time windows where deliveries are outside of those time windows. In some embodiments, a wait time can involve time to unload items from a tractor or other transport vessel or time to on load items to a tractor or other transport vessel. In many embodiments, a drive state of a break and/or a layover follow HOS rules for driving tractor trailers using ground transport in compliance with store rules. In this iteration, previous drive duration was reset to zero to account for the absence of drive time due to Island hopping. And previous on duty duration for a driver was time tracked at 3,000 s as well as previous non-sleep duration time tracked at 3,000 s, where time for breaks and layover time can be time tracked in this metric. Block 810 can proceed after block 840 to a block 845 (Iteration 5).

At block 845 (Iteration 5) of iterating a fifth service segment after a layover to drive to the next service location, the fifth service segment covers the first service segment, the second service segment, the third service segment, and the fourth service segment as cumulatively travelled a distance in total starting from the Depot→Drive→Port 1 Island hopping→Port 2→drive states→Drive→Wait→Break-→Layover→Store A and adding→Drive→Store B. In this iteration, the previous drive duration was 5,000 s indicating the time driven from Store A to Store B. And the previous on duty duration increased to 11,000 from 3,000 s and the previous non-sleep duration increased to 11,000 s from 3,000 s. Block 810 can proceed after block 845 to a block 850 (Iteration 6).

At block 850 (Iteration 6) of iterating a sixth service segment returning back to the Depot, the sixth service segment covers the first, second, third, fourth, and fifth service segment as cumulatively travelled a distance from Depot→Drive→Port 1→Island hopping→Port 2→drive states→Drive→Wait→Break→Layover→Store A and adding→Drive→Store B and adding→Depot. In this iteration, the previous drive duration was 5,000 s indicating the time driven from Store B back to the Depot. And the previous on duty duration increased to 11,000 from 11,000 s and the previous non-sleep duration increased to 11,000 s from 11,000 s. Block 810 can proceed after block 850 to a block 860.

Iterative process 800 includes block 860 of generating an output state that can be used to update a modified offshore route plan by incorporating added driver states. In this example, the updated offshore route plan can include the following driver states.

Depot→Drive→Port 1→Island Hop→Port 2→Drive-→Wait→Break→Layover→Store A→Drive→Store B→Depot Iterative process 800 also can illustrate the iterative process to determine whether the initial offshore route plan is feasible after adding new driver states and updating the offshore route plan accordingly.

Figure 9:
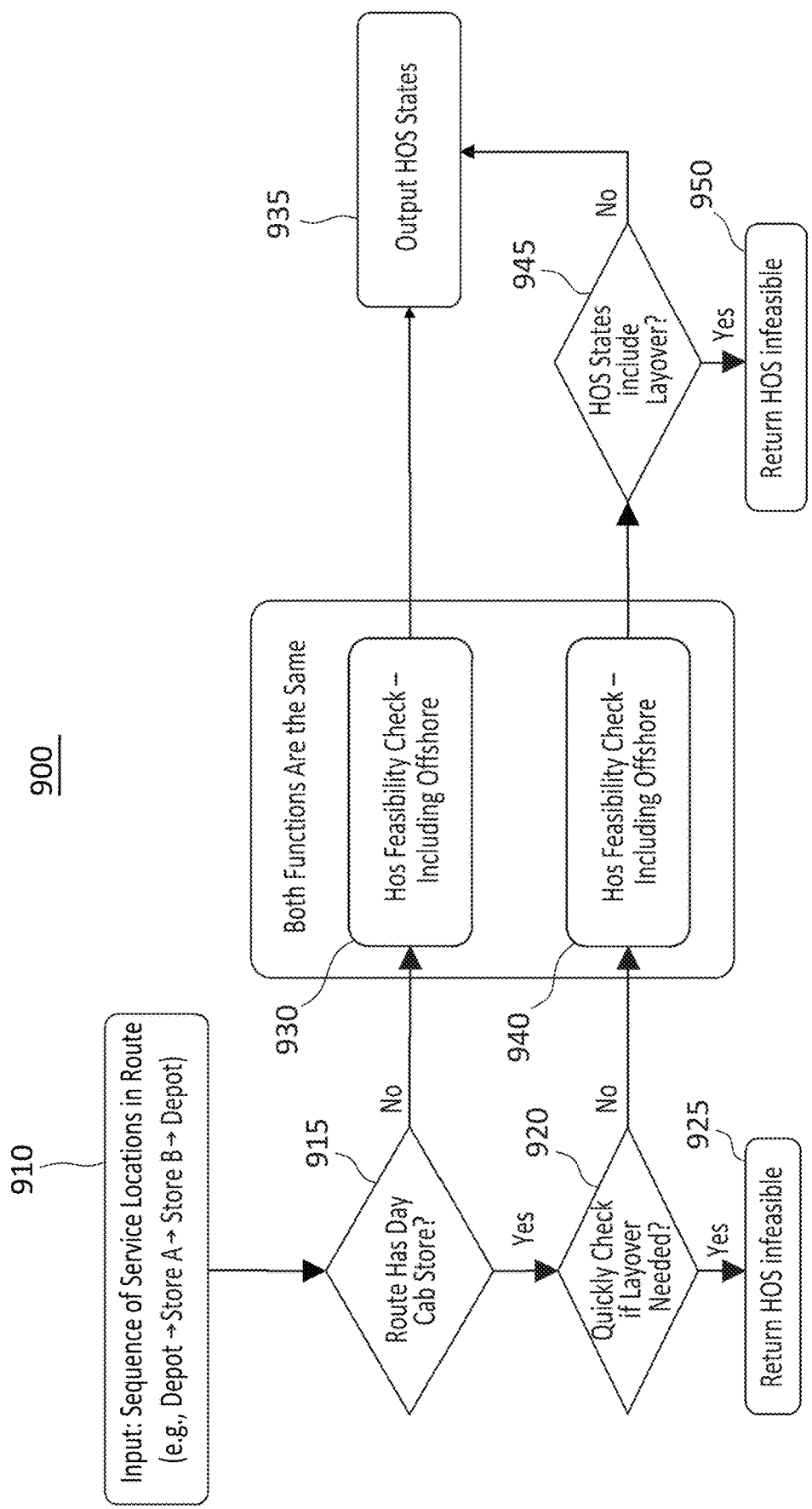
FIG. 9 illustrates a flow chart for a method of conducting a feasibility check for an offshore route plan in compliance with a Day Cab Tractor restriction, according to an embodiment.

Moving forward in the drawings, FIG. 9 illustrates a flow chart for a method 900 of conducting a feasibility check for an offshore route plan in compliance with a Day Cab Tractor restriction, according to an embodiment. Method 900 can include determining whether or not a store rule allows a driver to operate a day cab tractor or not. Method 900 is merely exemplary and is not limited to the embodiments presented herein. Method 900 can be employed in many different embodiments or examples not specifically depicted or described herein. In some embodiments, the procedures, the processes, and the activities of method 900 can be performed in the order presented. In other embodiments, the procedures, the processes, and/or the activities of method 900 can be performed in any suitable order. In still other embodiments, one or more procedures, the processes, and/or the activities of method 900 can be combined or skipped. In several embodiments, offshore route design system 300 (FIG. 3) can be suitable to perform method 900 and/or one or more of the activities of method 900.

In these or other embodiments, one or more of the activities of method 900 can be implemented as one or more computing instructions configured to run at one or more processors and configured to be stored at one or more non-transitory computer-readable media. Such non-transitory computer-readable media can be part of a computer system such as offshore route design system 300 (FIG. 3). The processor(s) can be similar or identical to the processor(s) described above with respect to computer system 100 (FIG. 1).

In various embodiments, method 900 can include a block 910 of receiving an initial sequence service location offshore route plan prior to running a feasibility check for store rules of a Day Cab Tractor. In many embodiments, one or more store locations can involve rules for using only Day Cab Tractors for ground transport. In some embodiments, method 900 can include conducting a feasibly check when store rules allow a driver or driver team to use a sleeper tractor cab as ground transport from one service segment to another service segment. In various embodiments, method 900 can proceed after block 910 to a block 915.

In several embodiments, method 900 can include block 915 of determining whether or not a store restriction for allowing a driver or driver team to drive only a Day Cab Tractor for delivery and prohibiting delivery or pick-up using a Sleeper Cab Tractor to deliver a load to a store. In many embodiments, such a store rule can be determined as a store-level input parameter. If block 915 is a yes, method 900 can proceed to a block 920. Otherwise, block 915 is no, and method 900 can proceed to a block 930.

In various embodiments, method 900 can include block 930 of running an HOS feasibility check of the offshore route plan when a store rule allows a driver to drive a Day Cab Tractor for delivery and prohibits a driver from driving a Sleeper Tractor Trailer for delivery. In a number of embodiments, due to safety limitations, a store can only support day cab tractors allowing for the offshore route plans to be planned without layovers. In many embodiments, adding a layover can involve reaching a maximum number of hours per the HOS rules for each driver operating a commercial vehicle whether the commercial vehicle is a Day Cab or Sleeper Cab. In some embodiments, drivers can elect to add a layover at one service location due to a store rule where a time window for delivery is closed at the time the driver arrives or plans to arrive. In several embodiments, the function in block 930 can be similar to identical to the function in a block 940. In various embodiments, method 900 can proceed after block 930 to a block 935.

In many embodiments, method 900 can include block 935 of outputting a feasible offshore route plan where HOS states are in compliance with HOS rules.

In a number of embodiments, method 900 can include block 920 of determining whether or not to add a drive state of a layover to the offshore route plan. If block 920 is yes, method 900 can proceed to a block 925. Otherwise, block 920 is no, and method 900 can proceed to a block 940.

In several embodiments, method 900 can include block 940 of running an HOS feasibility check of the offshore route plan when a store rule allows a driver to drive a Day Cab Tractor for delivery and prohibits a driver from driving a Sleeper Tractor Trailer for delivery. In many embodiments, method 900 can proceed after block 940 to a block 945.

In a number of embodiments, method 900 can include block 945 of determining whether or not to add a drive state of a layover for an offshore route plan that is determined to be feasible via the HOS feasibility check. If block 945 is yes, method 900 can proceed to a block 950. Otherwise block 945 is no and method 900 can proceed to block 935, as described above.

In some embodiments, method 900 can include block 925 of outputting that the offshore route plan is HOS infeasible after a driver state (e.g., drive state) layover is added and thereby terminating the feasibility check. Similarly, method 900 can include block 950 of determining that the offshore route plan is HOS infeasible and terminating the feasibility check.

Figure 10:
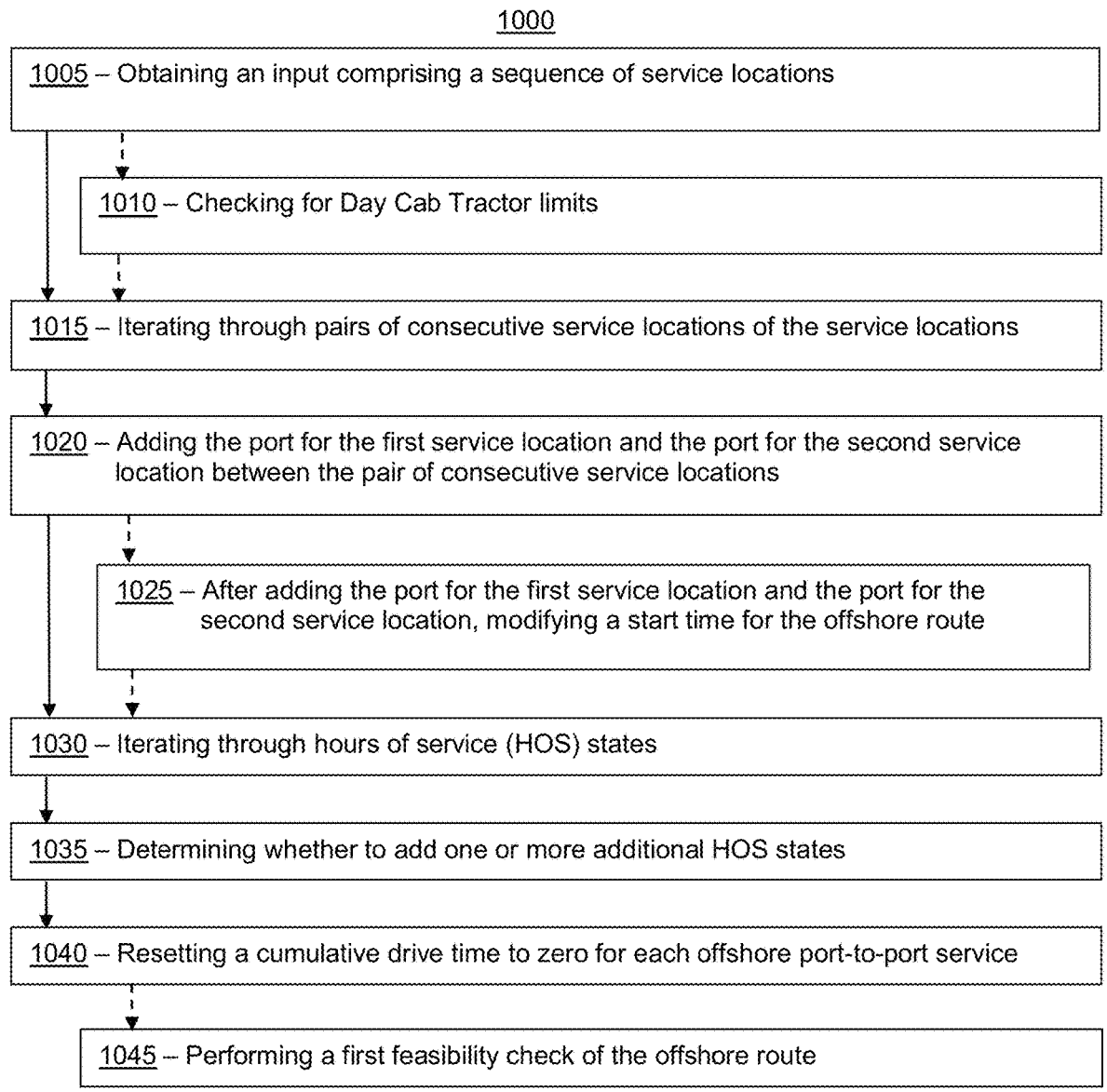
FIG. 10 illustrates a flow chart for a method of automatically generating offshore route plans (e.g., offshore routes) for a sequence of service locations, according to another embodiment.

Turning ahead in the drawings, FIG. 10 illustrates a flow chart for a method 1000 of automatically generating offshore route plans (e.g., offshore routes) for a sequence of service locations, according to another embodiment. Method 1000 also can include determining a feasible offshore route includes iterating HOS feasibility checks at each port location. Method 1000 is merely exemplary and is not limited to the embodiments presented herein. Method 1000 can be employed in many different embodiments and/or examples not specifically depicted or described herein. In some embodiments, the procedures, the processes, and/or the activities of method 1000 can be performed in the order presented. In other embodiments, the procedures, the processes, and/or the activities of method 1000 can be performed in any suitable order. In still other embodiments, one or more of the procedures, the processes, and/or the activities of method 1000 can be combined or skipped. In several embodiments, offshore route design system 300 (FIG. 3) can be suitable to perform method 1000 and/or one or more of the activities of method 1000.

In these or other embodiments, one or more of the activities of method 1000 can be implemented as one or more computing instructions configured to run at one or more processors and configured to be stored at one or more non-transitory computer-readable media. Such non-transitory computer-readable media can be part of a computer system such as communication system 301, iterations system 302, modification system 303, routing engine 304, loading system 305, rules system 306, resetting system 307, feasibility system 308 and/or network 330. The processor(s) can be similar or identical to the processor(s) described above with respect to computer system 100 (FIG. 1).

In several embodiments, method 1000 can include a block 1005 of obtaining an input comprising a sequence of service locations. In several embodiments, the input further can include a distance matrix for distances between the service locations, one or more store rules, and one or more transportation rules. Various activities associated with block 1005 can be similar or identical to the various activities described in connection with block 405 (FIG. 4), block 515 (FIG. 5), block 515 (FIG. 6), block 515 (FIG. 7), block 805 (FIG. 8), and/or block 910 (FIG. 9). In various embodiments, method 1000 can proceed after block 1005 to a block 1010 or a block 1015.

In many embodiments, method 1000 can alternately include block 1010 of checking for Day Cab Tractor limits. In a number of embodiments, block 1010 can be implemented as described above in block 915 (FIG. 9) and/or as described below in FIG. 11. In many embodiments, method 1000 can proceed after block 1010 to a block 1015.

In various embodiments, method 1000 also can include a block 1015 of iterating through pairs of consecutive service locations of the service locations to determine, for a pair of the pairs of consecutive service locations, whether a port for a first service location of the pair is different from a port for a second service location of the pair for an offshore route. In several embodiments, each store of the service locations is associated with a respective port. In many embodiments, each of the stores specifies one or more respective store rules. In a number of embodiments, block 1010 can be implemented as described above in connection with block 725 (FIG. 7). In many embodiments, method 1000 can proceed after block 1015 to a block 1020.

In several embodiments, method 1000 further can include block 1020 of adding the port for the first service location and the port for the second service location between the pair of consecutive service locations in the sequence of service locations. In a number of embodiments, block 1020 can be implemented as described above in connection with block 615, block 620, and block 620 (FIG. 6). In various embodiments, block 1020 can be implemented as described above in connection with FIG. 6.

In various embodiments, block 1020 also can include adding the port for the first service location and the port for the second service location between the pair of consecutive service locations, modifying a start time for the offshore route. In several embodiments, block 1020 can be implemented as described above in connection with block 630, block 635 (FIG. 6). In many embodiments, method 1000 can proceed after block 1020 to a block 1025 or a block 1030.

In some embodiments, method 1000 additionally and alternatively can include a block 1025 of after adding the port for the first service location and the port for the second service location between the pair of consecutive service locations, modifying a start time for the offshore route. In various embodiments, block 1025 can be implemented as described above in connection with block 630, block 635 (FIG. 6). In many embodiments, method 1000 can proceed after block 1025 to a block 1030.

In several embodiments, method 1000 also can include a block 1030 of iterating through HOS states of the offshore route. In a number of embodiments, block 1030 can be implemented as described above in connection with block 625 (FIG. 6) and/or block 725 (FIG. 7). In many embodiments, method 1000 can proceed after block 1030 to a block 1035.

In many embodiments, method 1000 further can include a block 1035 of iterating through HOS states of the offshore route to further perform determining whether to add one or more additional HOS states in the offshore route. In various embodiments, block 1035 also can include one or more additional HOS states that can include a break or a layover. In several embodiments, block 1035 can be implemented as described above in connection with block 625, block 675, block 685 (FIG. 6), block 710, block 720, block 725, and/or block 730 (FIG. 7). In many embodiments, method 1000 can proceed after block 1035 to a block 1040.

In various embodiments, method 1000 additionally can include a block 1040 of iterating through HOS states of the offshore route to further perform resetting a cumulative drive time to zero for each offshore port-to-port service. In many embodiments, block 1040 also can include resetting the cumulative drive time to zero for each offshore port-to-port service is performed using a drive time tracker. In some embodiments, block 1040, can be implemented described above in connection with block 660, block 665, block 670, (FIG. 6) and block 710, block 715, (FIG. 7). In many embodiments, method 1000 can proceed after block 1040 to a block 1045.

In a number of embodiments, method 1000 also and alternatively can include a block 1045 of performing a first feasibility check of the offshore route based on at least one or more HOS transportation rules and one or more store rules. In several embodiments, block 1045 can be implemented as described above in connection with block 480 (FIG. 4), block 435 (FIG. 5), block 525, block 530, block 535 (FIG. 5), block 675 (FIG. 6), block 725, and block 730 (FIG. 7).

Figure 11:
FIG. 11 illustrates a flow chart for the block of checking for Day Cab Tractor limits of FIG. 10.
Figure 11:

Turning ahead in the drawings, FIG. 11 illustrates a flow chart for the block of checking for Day Cab Tractor limits of FIG. 10. Block 1010 can be a subset of activities in connection with checking for Day Cab Tractor limits.

In many embodiments, block 1010 can include a block 1105 of checking whether one or more stores of the service locations have day cab tractor limits. In some embodiments, block 1105 can be implemented similarly or identical as described above in connection with block 915 (FIG. 9). Block 1010 can proceed after block 1105 to a block 1110.

In various embodiments, block 1010 also can include block 1110 of when the one or more stores do not have day cab tractor limits, running a second feasibility check. In some embodiments, block 1110 also can include when the one or more stores have day cab tractor limits, checking whether the HOS states include a layover. In several embodiments, block 1110 further can include when the HOS states include a layover, outputting that the HOS states for the offshore route are infeasible. In many embodiments, block 1110 additionally can include when the HOS states do not include a layover, running a third feasibility check. In various embodiments, block 1110 also can include when the HOS states do not include a layover, running a third feasibility check. In some embodiments, after running the third feasibility check, checking whether the HOS states include a layover. In a number of embodiments, when the HOS states include a layover, outputting that the HOS states for the offshore route are infeasible. In some embodiments, block 1105 can be implemented similarly or identical as described above in connection with block 915 and/or block 930 (FIG. 9). Block 1010 can proceed after block 1110 to a block 1115.

In several embodiments, block 1010 further can include a block 1115 of after the second feasibility check, outputting the HOS states for the offshore route. In some embodiments, block 1105 can be implemented similarly or identical as described above in connection block 935 (FIG. 9).

Returning to FIG. 3, in many embodiments, communication system 301 can at least partially perform block 405 (FIG. 4) of receiving input parameters, block 805 of receiving one or more data metrics (e.g., inputs) to feed into this iterative process of adding driver states for each stop along the offshore route plan, block 515 (FIG. 5) of inputting a sequence of service locations in a route plan (e.g., route), block 910 (FIG. 9) of receiving an initial sequence service location offshore route plan prior to running a feasibility check for store rules of a Day Cab Tractor, and/or block 1005 (FIG. 10) of obtaining an input comprising a sequence of service locations, In number of embodiments, iteration system 302 can at least partially perform block 525 (FIG. 5) of determining whether or not each sequence of service location for a respective iteration of the offshore route complies with the HOS rules, block 725 (FIG. 7) of iterating the pre-processed offshore route plan, block 810 (FIG. 8) of iterating each service segment to determine whether to add one or more driver states, block 1015 (FIG. 10) of iterating through pairs of consecutive service locations of the service locations to determine, for a pair of the pairs of consecutive service locations, whether a port for a first service location of the pair is different from a port for a second service location of the pair for an offshore route, block 1030 (FIG. 10) of iterating through HOS states of the offshore route, block 1035 (FIG. 10) of iterating through HOS states of the offshore route to further perform determining whether to add one or more additional HOS states in the offshore route, block 1040 (FIG. 10) of iterating through HOS states of the offshore route to further perform resetting a cumulative drive time to zero for each offshore port-to-port service, In various embodiments, modification system 303 can at least partially perform block 610 (FIG. 6) of creating input data for driver HOS states by analyzing each location in the offshore route, block 615 (FIG. 6) of determining whether there are more than one port between two service locations by analyzing whether a first port is different from a second port between two service locations, block 620 (FIG. 6) of adding the one or more ports between service locations and modifying the offshore route, block 625 (FIG. 6) of adding a new service location to the sequence of service locations, block 630 (FIG. 6) of determining whether to add a new start time for each service location and/or each new iteration of an offshore route, block 635 (FIG. 6) of setting a start time for a modified service location of the sequence of service locations, block 685 (FIG. 6) of returning an output of HOS driver states that are feasible for the sequence of service locations, as modified, block 710 (FIG. 7) of adding two consecutive ports to the initial offshore route, block 860 (FIG. 8) of generating an output state that can be used to update a modified offshore route plan by incorporating added driver states and/or block 935 (FIG. 9) of outputting a feasible offshore route where HOS states are in compliance with HOS rules.

In several embodiments, routing engine 304 can at least partially perform block 420 (FIG. 4) of constructing a route based on the input parameters (block 405) of the orders, block 440 (FIG. 4) for optimizing a route based on the constructed routes, block 460 (FIG. 4) of outputting a route solution, block 470 (FIG. 4) of constructing offshore routes and optimizing offshore routes, block 515 (FIG. 5) of inputting a sequence of service location route, block 650 (FIG. 6) of processing data for each service location and drive state from one or more previous service locations, block 720 (FIG. 7) of after pre-processing the initial offshore route plan, modifying or optimizing the route, block 1020 (FIG. 10) of when the port for the first service location is different from the port for the second service location, adding the port for the first service location and the port for the second service location between the pair of consecutive service locations in the sequence of service locations, block 1105 (FIG. 11) of checking whether one or more stores of the service locations have day cab tractor limits, and/or block 1115 (FIG. 11) of after the second feasibility check, outputting the HOS states for the offshore route.

In various embodiments, loading system 305 can at least partially perform block 405 (FIG. 4) of receiving input parameters that can be used in generating a load plan, block 410 (FIG. 4) of building stacks can be employed to build stacks of pallets based on a number of orders for delivery to another location, such as stores located in an overseas location or near a port, block 415 (FIG. 4) of splitting orders, include block 445 (FIG. 4) of optimizing a load, and/or block 450 (FIG. 4) of outputting the load solution based on a type of tractor-trailer set up, In various embodiments, rules system 306 can at least partially perform block 915 (FIG. 9) of determining whether or not a store restriction for allowing a driver or driver team to drive only a Day Cab Tractor for delivery and prohibiting delivery or pick-up using a Sleeper Cab Tractor to deliver a load to a store, block 1010 (FIG. 10) of checking for Day Cab Tractor limits, and/or block 1045 (FIG. 10) of performing a first feasibility check of the offshore route based on at least one or more HOS transportation rules and one or more store rules, In many embodiments, resetting system 307 can at least partially perform block 670 (FIG. 6) of updating a drive time tracker by resetting driver hours for each alternative transportation method of each service location, such as air transport or ocean transport.

In various embodiments, feasibility system 308 can at least partially perform block 425 (FIG. 4) of conducting a load feasibility check, block 430 (FIG. 4) of conducting a route feasibility check, block 435 (FIG. 4) of conducting an HOS feasibility check, block 480 (FIG. 4) of conducting one or more feasibility checks on the constructed route, block 435 (FIG. 4) of running a HOS feasibility check on an iteration of the sequence of service locations of block 515 (FIG. 5), block 530 (FIG. 5) returning a feasible offshore route as an optimized route, block 535 (FIG. 5) of returning an infeasible sequence of service location for the offshore route that violates one or more HOS rules, block 660 (FIG. 6) of determining whether to include a break time period and/or a layover time period for each driver or a team of drivers, block 675 (FIG. 6) of determining whether the updated service location is feasible via the HOS rules, block 725 (FIG. 7) of triggering iterations of HOS feasibility checks to determine whether the existing offshore route complies and/or violates any HOS rules by the addition of drive states, block 910 (FIG. 9) of receiving an initial sequence service location offshore route prior to running a feasibility check for store rules of a Day Cab Tractor, block 920 (FIG. 9) of determining whether or not to add a drive state of a layover to the offshore route, block 930 (FIG. 9) of running an HOS feasibility check of the offshore route when a store rule allows a driver to drive a Day Cab Tractor for delivery and prohibits a driver from driving a Sleeper Tractor Trailer for delivery, block 940 (FIG. 9) of running an HOS feasibility check of the offshore route when a store rule allows a driver to drive a Day Cab Tractor for delivery and prohibits a driver from driving a Sleeper Tractor Trailer for delivery, block 945 (FIG. 9) of determining whether or not to add a drive state of a layover for an offshore route that is determined to be feasible via the HOS feasibility check, block 925 (FIG. 9) of determining that the offshore route is HOS infeasible after a drive state layover is added and thereby terminating the feasibility check, block 1110 (FIG. 10) of when the one or more stores do not have day cab tractor limits, running a second feasibility check, and/or block 1110 (FIG. 11) additionally can include when the HOS states do not include a layover, running a third feasibility check.

In many embodiments, the techniques also described herein can be used continuously at a scale that cannot be handled using manual techniques and can include a fast response time of less than 1 millisecond. For example, the number of daily and/or monthly loads to transport to ground locations and offshore locations in an offshore route can exceed approximately ten million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as determining whether to update a product with certain derived attributes based on rule change events does not exist outside the realm of computer networks. Moreover, the techniques described herein can solve a technical problem that cannot be solved outside the context of computer networks. Specifically, the techniques described herein cannot be used outside the context of computer networks, in view of a lack of data that can power and/or feed an online orders via a website that is part of the techniques described herein would not exist.

Various embodiments can include a system comprising one or more processors and one or more non-transitory computer-readable media storing computing instructions, that when executed on the one or more processors, cause the one or more processors, to perform certain acts. The acts can include obtaining an input comprising a sequence of service locations. The acts also can include iterating through pairs of consecutive service locations of the service locations. The iterations can determine, for a pair of the pairs of consecutive service locations, whether a port for a first service location of the pair is different from a port for a second service location of the pair for an offshore route. When the port for the first service location is different from the port for the second service location, the acts further can include adding the port for the first service location and the port for the second service location between the pair of consecutive service locations in the sequence of service locations. The acts additionally can include iterating through hours of service (HOS) states of the offshore route. The acts of iterating can perform determining whether to add one or more additional HOS states in the offshore route. The acts of iterating also can perform resetting a cumulative drive time to zero for each offshore port-to-port service.

A number of embodiments can include a method being implemented via execution of computing instructions configured to run at one or more processors and stored at one or more non-transitory computer-readable media. The method can include obtaining an input comprising a sequence of service locations. The method also can include iterating through pairs of consecutive service locations of the service locations. The iterations can determine, for a pair of the pairs of consecutive service locations, whether a port for a first service location of the pair is different from a port for a second service location of the pair for an offshore route. When the port for the first service location is different from the port for the second service location, the method further can include adding the port for the first service location and the port for the second service location between the pair of consecutive service locations in the sequence of service locations. The method additionally can include iterating through hours of service (HOS) states of the offshore route. The method of iterating also can perform determining whether to add one or more additional HOS states in the offshore route. The method of iterating also can perform resetting a cumulative drive time to zero for each offshore port-to-port service.

Although automatically determining a feasible offshore route has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 may be modified, and that the foregoing discussion of certain of these embodiments does not necessarily represent a complete description of all possible embodiments. For example, one or more of the procedures, processes, or activities of FIGS. 3-7, 9-11 may include different procedures, processes, and/or activities and be performed by many different modules, in many different orders, and/or one or more of the procedures, processes, or activities of FIGS. 3-7, 9-11 may include one or more of the procedures, processes, or activities of another different one of FIGS. 3-7, 9-11.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions, that when executed on the one or more processors, cause the one or more processors, to perform:
   obtaining, via an Internet-based network connection and from computer systems, an input comprising a sequence of service locations, wherein the sequence of service locations comprise service locations, wherein the computer systems are associated with physical onshore stores or physical onshore distribution centers, wherein the physical onshore stores and the physical onshore distribution centers are located at the service locations, and wherein the sequence of service locations is part of an offshore route plan for delivering orders to the physical onshore stores or the physical onshore distribution centers;
   iterating through pairs of consecutive service locations of the service locations to determine, for a pair of the pairs of consecutive service locations, whether a port for a first service location of the pair is different from a port for a second service location of the pair for an offshore route;
   when the port for the first service location is different from the port for the second service location, adding the port for the first service location and the port for the second service location between the pair of consecutive service locations in the sequence of service locations;
   updating a drive time tracker based on stop locations added to the offshore route plan, wherein the drive time tracker tracks ground transport periods of time for a driver of the offshore route to determine when a break for the driver should be inserted as part of the offshore route;
   iterating through hours of service (HOS) states of the offshore route to further perform:
      determining whether to add one or more additional HOS states in the offshore route based on at least data from the drive time tracker;
      resetting a cumulative drive time to zero for each offshore port-to-port service when ground transportation is delayed or not used as part of the sequence of service locations in the offshore route plan; and
      processing the sequence of service locations to comply with one or more HOS transportation rules based on data obtained via the Internet-based network connection from the one or more computer systems; and
   outputting an instruction to a plurality of vehicles, including a ground transportation vehicle and a non-ground transportation vehicle, to control operation of the plurality of vehicles to deliver orders to the physical onshore stores or the physical onshore distribution centers according to the offshore route plan.

2. The system of claim 1, wherein the input further comprises:
   a distance matrix for distances between the service locations, one or more store rules, and the one or more HOS transportation rules.

3. The system of claim 1, wherein the computing instructions, when executed on the one or more processors, further cause the one or more processors to perform:

after adding the port for the first service location and the port for the second service location between the pair of consecutive service locations, modifying a start time for the offshore route.

4. The system of claim 1, wherein:
each store of the physical onshore stores is associated with a respective port; and
each store of the physical onshore stores specifies one or more respective store rules.

5. The system of claim 1, wherein the computing instructions, when executed on the one or more processors, further cause the one or more processors to perform:
performing a first feasibility check of the offshore route based on at least the one or more HOS transportation rules and one or more store rules.

6. The system of claim 1, wherein:
the one or more additional HOS states comprise a break or a layover.

7. The system of claim 1, wherein:
resetting the cumulative drive time to zero for each offshore port-to-port service when the ground transportation is delayed or not used as part of the sequence of service locations in the offshore route plan is performed using the drive time tracker.

8. The system of claim 1, wherein the computing instructions, when executed on the one or more processors, further cause the one or more processors to perform:
checking, using data obtained via the Internet-based network connection from the one or more computer systems, whether the physical onshore stores of the service locations have day cab tractor limits; and
when the physical onshore stores do not have the day cab tractor limits:
running a second feasibility check; and
after the second feasibility check, outputting the HOS states for the offshore route.

9. The system of claim 8, wherein:
when the physical onshore stores have the day cab tractor limits:
checking whether the HOS states include the layover; and
when the HOS states include the layover, outputting that the HOS states for the offshore route are infeasible.

10. The system of claim 9, wherein:
when the HOS states do not include the layover:
running a third feasibility check;
after running the third feasibility check, checking whether the HOS states resulting from the third feasibility check include the layover; and
when the HOS states resulting from the third feasibility check include the layover, outputting that the HOS states resulting from the third feasibility check for the offshore route are infeasible.

11. A method being implemented via execution of computing instructions configured to run on one or more processors and stored at one or more non-transitory computer-readable media, the method comprising: obtaining, via an Internet-based network connection and from computer systems, an input comprising a sequence of service locations, wherein the sequence of service locations comprise service locations, wherein the computer systems are associated with physical onshore stores or physical onshore distribution centers, wherein the physical onshore stores and the physical onshore distribution centers are located at the service locations, and wherein the sequence of service locations is part of an offshore route plan for delivering orders to the physical onshore stores or the physical onshore distribution centers;
iterating through pairs of consecutive service locations of the service locations to determine, for a pair of the pairs of consecutive service locations, whether a port for a first service location of the pair is different from a port for a second service location of the pair for an offshore route;
when the port for the first service location is different from the port for the second service location, adding the port for the first service location and the port for the second service location between the pair of consecutive service locations in the sequence of service locations;
updating a drive time tracker based on stop locations added to the offshore route plan, wherein the drive time tracker tracks ground transport periods of time for a driver of the offshore route to determine when a break for the driver should be inserted as part of the offshore route;
iterating through hours of service (HOS) states of the offshore route to further perform:
determining whether to add one or more additional HOS states in the offshore route based on at least data from the drive time tracker;
resetting a cumulative drive time to zero for each offshore port-to-port service when ground transportation is delayed or not used as part of the sequence of service locations in the offshore route plan; and
processing the sequence of service locations to comply with one or more HOS transportation rules based on data obtained via the Internet-based network connection from the one or more computer systems; and
outputting an instruction to a plurality of vehicles to control operation of the plurality of vehicles to deliver orders to the physical onshore stores or the physical onshore distribution centers according to the offshore route plan.

12. The method of claim 11, wherein the input further comprises:
a distance matrix for distances between the service locations, one or more store rules, and the one or more HOS transportation rules.

13. The method of claim 11, further comprising:
after adding the port for the first service location and the port for the second service location between the pair of consecutive service locations, modifying a start time for the offshore route.

14. The method of claim 11, wherein at least one of:
(a)
each store of the physical onshore stores is associated with a respective port; and
each store of the physical onshore stores specifies one or more respective store rules; or
(b)
the one or more additional HOS states comprise a break or a layover.

15. The method of claim 11, further comprising:
performing a first feasibility check of the offshore route based on at least the one or more HOS transportation rules and one or more store rules.

16. The method of claim 11, wherein:
resetting the cumulative drive time to zero for each offshore port-to-port service when the ground transportation is delayed or not used as part of the sequence of service locations in the offshore route plan is performed using the drive time tracker.

17. The method of claim 11, further comprising:
checking, using data obtained via the Internet-based network connection from the one or more computer systems, whether the physical onshore stores of the service locations have day cab tractor limits; and
when the physical onshore stores do not have the day cab tractor limits:
running a second feasibility check; and
after the second feasibility check, outputting the HOS states for the offshore route.

18. The method of claim 17, wherein:
one of:
(a)
when the physical onshore stores have the day cab tractor limits:
checking whether the HOS states include the layover; and
when the HOS states include the layover, outputting that the HOS states for the offshore route are infeasible;
or
(b)
when the physical onshore stores have the day cab tractor limits checking whether the HOS states include the layover;
when the HOS states include the layover, outputting that the HOS states for the offshore route are infeasible;
when the HOS states do not include the layover:
running a third feasibility check;
after running the third feasibility check, checking whether the HOS states resulting from the third feasibility check include the layover; and
when the HOS states resulting from the third feasibility check include the layover, outputting that the HOS states for the offshore route are infeasible.

19. A non-transitory computer-readable medium storing instructions, wherein the instructions, upon execution by a processor, cause the processor to perform operations comprising:
obtaining, via an Internet-based network connection and from computer systems, an input comprising a sequence of service locations, wherein the sequence of service locations comprise service locations, wherein the computer systems are associated with physical onshore stores or physical onshore distribution centers, wherein the physical onshore stores and the physical onshore distribution centers are located at the service locations, and wherein the sequence of service locations is part of an offshore route plan for delivering orders to the physical onshore stores or the physical onshore distribution centers;
iterating through pairs of consecutive service locations of the service locations to determine, for a pair of the pairs of consecutive service locations, whether a port for a first service location of the pair is different from a port for a second service location of the pair for an offshore route;
when the port for the first service location is different from the port for the second service location, adding the port for the first service location and the port for the second service location between the pair of consecutive service locations in the sequence of service locations;
updating a drive time tracker based on stop locations added to the offshore route plan, wherein the drive time tracker tracks ground transport periods of time for a driver of the offshore route to determine when a break for the driver should be inserted as part of the offshore route;
iterating through hours of service (HOS) states of the offshore route to further perform:
determining whether to add one or more additional HOS states in the offshore route based on at least data from the drive time tracker;
resetting a cumulative drive time to zero for each offshore port-to-port service when ground transportation is delayed or not used as part of the sequence of service locations in the offshore route plan; and
processing the sequence of service locations to comply with one or more HOS transportation rules based on data obtained via the Internet-based network connection from the one or more computer systems; and
outputting an instruction to a plurality of vehicles to control operation of the plurality of vehicles to deliver orders to the physical onshore stores or the physical onshore distribution centers according to the offshore route plan.

20. The non-transitory computer-readable medium of claim 19, wherein the input further comprises:
a distance matrix for distances between the service locations, one or more store rules, and the one or more HOS transportation rules.

* * * * *